(12) United States Patent
Rönneke et al.

(10) Patent No.: US 7,616,570 B2
(45) Date of Patent: Nov. 10, 2009

(54) ARRANGEMENT AND METHOD RELATING TO TRAFFIC CONTROL

(75) Inventors: Hans Rönneke, Kungsbacka (SE); Henrik Bengtsson, Göteborg (SE)

(73) Assignee: Telefonaktiebolaget L M Ericsson (PUBL), Stockholm (SE)

(*) Notice: Subject to any disclaimer, the term of this patent is extended or adjusted under 35 U.S.C. 154(b) by 907 days.

(21) Appl. No.: 10/470,851

(22) PCT Filed: Feb. 5, 2002

(86) PCT No.: PCT/SE02/00194

§ 371 (c)(1),
(2), (4) Date: Jan. 8, 2004

(87) PCT Pub. No.: WO02/063837

PCT Pub. Date: Aug. 15, 2002

(65) Prior Publication Data

US 2004/0105393 A1    Jun. 3, 2004

(30) Foreign Application Priority Data

Feb. 7, 2001    (SE) .................................. 0100392

(51) Int. Cl.
*G01R 31/08* (2006.01)
*H04L 12/28* (2006.01)

(52) U.S. Cl. .................................. 370/235; 370/395.4

(58) Field of Classification Search ......... 370/229–240, 370/395.4–395.43, 412–414, 429, 325, 328
See application file for complete search history.

(56) References Cited

U.S. PATENT DOCUMENTS

| | | | | |
|---|---|---|---|---|
| 5,926,458 A * | 7/1999 | Yin | .............................. | 370/230 |
| 6,094,420 A * | 7/2000 | Lemieux | ...................... | 370/232 |
| 6,389,019 B1 * | 5/2002 | Fan et al. | ................ | 370/395.42 |
| 6,570,873 B1 * | 5/2003 | Isoyama et al. | .............. | 370/375 |
| 6,570,883 B1 * | 5/2003 | Wong | .......................... | 370/412 |
| 6,611,522 B1 * | 8/2003 | Zheng et al. | ............ | 370/395.21 |
| 6,879,603 B1 * | 4/2005 | Koenig et al. | ................ | 370/535 |
| 6,975,638 B1 * | 12/2005 | Chen et al. | ................... | 370/412 |
| 6,985,442 B1 * | 1/2006 | Wang et al. | .................. | 370/232 |
| 7,023,855 B2 * | 4/2006 | Haumont et al. | .......... | 370/395.1 |

* cited by examiner

*Primary Examiner*—Kwang B Yao
*Assistant Examiner*—Tung Q Tran

(57) ABSTRACT

The present invention relates to an arrangement and a method for flow control of data packets in a communications system supporting communication of packet data. The arrangement comprises classifying means (1) for, by means of a number of parameters defining a number of data packet subflows, whereby each received packet belongs to one of the subflows. For each received data packet, an individual packet holding time is given by the size of the data packet and by the (desired) bandwidth of the subflow to which the packet belongs. It further comprises first queueing means (2) comprising one subflow queue (SFQ) for each subflow, such that received data packets are placed in the appropriate subflow queue, and one or more second queueing means (3), each comprising a circular timeslot array register, wherein for each timeslot a timeslot queue (TSQ) is provided. Data packets from the subflow queues are placed in the appropriate time slot queues in relation to a current time slot queue, the packets in which, if any, currently being output, such that the data packet holding times can be observed.

29 Claims, 13 Drawing Sheets

ARRANGEMENT AND METHOD RELATING TO TRAFFIC CONTROL

BACKGROUND OF THE INVENTION

1. Field of the Invention

The present invention relates to an arrangement for controlling data packet flow in a communication system supporting communication of packet data, e.g. within a packet based network in general or between external packet data networks and end users e.g. over a backbone/core network. The invention also relates to a traffic node, in a communication system supporting communication of packet data within the network or over a backbone/core network, with flow controlling capability. The invention also relates to a method of controlling data packet flow in a communication system supporting communication of packet data, within an IP-network or particularly from external packet data networks towards end users over a backbone or core network.

2. Description of the Related Art

Traditionally, or so far, real-time communication service has generally been handled within the 2G telecommunication environment. Many applications designed in the 2G telecommunication environment have been implemented with a proprietary kind of service network to handle the specific application QoS requirements. This means that such applications generally work well as isolated applications, but it is difficult to integrate them with other applications developed in similar ways. Applications developed for the IP environment, or the Internet, have mainly been based on established standards supporting extensive integration of different applications. The data communication, or the Internet, community has so far not been able to successfully handle real-time communication services in a commercial scale. However, with the introduction of 3G networks (3GPP networks) which may be fixed as well as mobile, telecommunication and data communication services and applications will be mixed, higher and lower bit rates will be mixed as well as real-time and non-real-time traffic will be mixed. 3GPP is the 3rd generation Partnership Project. Standardization work is going on within 3GPP relating to GPRS/UMTS networks and in IETF (Internet Engineering Task Force) and also by means of additional concepts and mechanisms that are developed, to put the mobile Internet into practice.

Routers in the Internet are low-cost equipment as compared to the equipment that has been used traditionally for the international telephony communications network. With the introduction of the mobile Internet, a new generation of equipment will be required. Such equipment will have a lot in common with the conventional Internet equipment, such as routers, but additional requirements are imposed to handle the mobility functionality. One such requirement relates to the capability of handling specific mobile Internet protocols. A particular example of such a requirement, for the GPRS (General Packet Radio Service) and UMTS (Universal Mobile Telecommunication System), is the GPRS Tunneling Protocol (GTP). With the Release 99 and Release 00 of the 3GPP (GPRS/UMTS) standard advanced mechanisms relating to the handling of real-time traffic are also introduced. The 3GPP standard 3G TS 23.107, "QoS Concept and Architecture", deals with some basic mechanisms in this respect.

Also within the Internet community, e.g. IETF, an intensive work is going on aiming at standardizing mechanisms for handling real-time traffic and multimedia traffic. One very important issue in this respect deals with how a limited bandwidth should be shared between the numerous applications connected to the Internet. The applications and the protocols they use do not always share the bandwidth in a fair way, or do not even try to share the bandwidth in a fair way. One example of that is given by the UDP protocol (User Datagram Protocol) and the TCP (Transmission Control Protocol). The TCP protocol implements built in flow control mechanisms but the UDP does not comprise any flow control mechanisms at all. The fair sharing of bandwidth is moreover complicated due to the fact that many applications are very bursty by nature, such as for example web-applications. Thus, even if the number of users is very large, the total traffic is not leveled (statistical multiplexing) as it is within the normal telecommunication networks. This contributes in making network dimensioning difficult. Moreover the availability of services to the end user will be unreliable. One of the main issues within real-time and multimedia networks is concerned with controlling the IP Packet flow. Several different queueing techniques are known which deal with flow control. Examples of known queueing techniques are Priority Queueing, Class-Based Queueing and Weighted Fair Queueing. The Differential Services (DiffServ) architecture (IN) and Admission Control techniques are also important techniques within the area of controlling flows.

However, all these known techniques normally operate on aggregates of flows of IP packets. The main reason therefore is that, if they were to operate on a per-flow manner, they simply would not scale to provide the desired performance in high-volume, high-speed environments. As an example, Weighted Fair Queueing (WFQ) used in a DiffServ environment is often limited to the six classes defined in RFC 2597 and RFC 2598 (Request For Comment, Network Working Group, Internet Society 1999), which documents herewith are incorporated herein by reference.

WFQ scheduling of only six aggregated flows can be realized without significant computational overhead.

It is however a problem, for example in a mobile Internet environment, that controlling flows on an aggregated level is not sufficient. One reason therefore is that some link resources may be very scarce, limited and therefore expensive. It is also complicated if on the path from for example a packet data network to an end user, the traffic resources differ a lot, i.e. the available bandwidth may differ a lot from one link to another. It is also a disadvantage that for example an operator of a mobile communication system is not able to offer different service levels to subscribers. Therefore Traffic Conditioning on max bit rate per individual flow is included in the QoS architecture of for example UMTS. In UMTS terminology, a flow is defined as one GTP tunnel or one PDP Context (secondary or not), cf. for example 3GPP, 3GTS 23.060 V3.4.0 (2000-07) for description of protocols and terminology which herewith is incorporated herein by reference. However, this is not supported by the known queueing techniques.

SUMMARY OF THE INVENTION

What is needed is therefore an arrangement for data packet flow control in a communication system supporting communication of packet data, within the network or between external packet data networks and end users over a backbone or a core network, through which the traffic flow control possibilities are improved. An arrangement is particularly needed which provides for a flexible traffic flow control.

An arrangement is also needed through which network dimensioning is facilitated by means of improved packet data flow control possibilities. Moreover an arrangement is needed through which it is possible to contribute in making the service reliability of accessing end users better than for hitherto known systems. An arrangement for flow control is also needed which is easy to implement, more particularly at a low cost.

Even more particularly a flow control arrangement is needed through which data packet traffic flow control can be done while considering the available bandwidth on different links, particularly on those links constituting the most limited or expensive resources on the path from packet data generating means to end users.

Moreover an arrangement for packet data flow control is needed through which it will be possible to reduce or even prevent overload, at least in some sensitive parts of the network where it is desired to prevent overload etc. e.g. because those parts comprise scarce or expensive resources.

Particularly an arrangement for packet data flow control is needed through which exposed or selected nodes can be protected against overload conditions, or from having to use large storing facilities.

A traffic control arrangement is also needed through which bandwidth considerations can be taken into account in an efficient manner, and even more particularly an arrangement is needed through which it gets possible to take into account the fact that some of the resources are limited resources, e.g. the radio link, as compared to other links within the network.

An arrangement is also needed which enables (max) bandwidth/bit rate as a parameter in subscription or service offerings. An arrangement is also needed through which it gets possible for an operator to handle end user specific subscriptions relating to different service levels and to handle the traffic flow with due consideration of different QoS classes or service classes.

Particularly an arrangement is needed through which the computational overhead does not, or only to a limited extent, increase depending on the number of flows that are controlled, i.e. that it gets possible to implement traffic flow control in a more flexible manner than in hitherto known systems in which flow control is done on a per aggregate flow level and for which the number of aggregated flows that can be controlled is strictly limited to ensure an acceptable computational overhead.

A traffic node in a communication system supporting communication of packet data is also needed through which one or more of the above mentioned objects can be met. Still further a method of controlling the packet data flow in a communication system supporting communication of packet data is needed, through which one or more of the above mentioned objects can be met.

Therefore an arrangement for data packet flow control is provided which comprises, or is in communication with, classifying means for, by means of, or based on a number of parameters, defining a number of packet subflows whereby each received packet belongs to one of the subflows.

For each data packet received in the arrangement, an individual packet holding time is given by the size of the data packet and by the desired bandwidth of the subflow to which the packet belongs, or by the maximum bit rate the subflow should have. The arrangement also comprises first queueing means comprising one subflow queue for each subflow, such that received data packets are placed in the appropriate subflow queue. In addition thereto it comprises one or more second queueing means each comprising a circular timeslot array register, wherein for each timeslot a timeslot queue is provided. Data packets from subflow queues are placed in the appropriate time slot queues in relation to a current time slot, the packets of which currently being output, if there are any packets in the current time slot queue, such that the requested data packet holding times are observed before output of the data packets from the respective time slot queues.

In a particularly advantageous implementation there is maximum one data packet from each subflow queue contained in the second queueing means simultaneously. In such an implementation, when a data packet is output from the time slot queue in which it is placed, i.e. when the time slot forms the current time slot, the subsequent data packet in the subflow queue from where it originated (if there still is at least one data packet in that subflow queue), is placed in the appropriate time slot queue for that data packet, such that the holding time of said preceding packet will be observed. Preferably, for each data packet in a time slot queue that is output when the time slot forms the current time slot, the subsequent data packet in the respective subflow queue from where the respective data packet originated, is fetched to the second queueing means and placed in a time slot queue such that the respective, requested holding times of the respective packets will be observed.

In an advantageous implementation the second queueing means comprises an array of N time slots each corresponding to a time interval $t_i$, such that N time slot queues are provided. The N time slots correspond to a time interval T which is the sum of the time intervals $t_i$. In a preferred implementation a pointer is used which points at the current time slot and thus activates output of the packets in the corresponding current time slot queue. The current time slot pointer is moved one step forwards every T/N seconds, or alternatively as soon as all packets are output, unless this occurs before T/N seconds have lapsed. This means that it activates one time slot after another stepwise, and since the array register is circular, on time slot $T_{N-1}$ will follow time slot $T_0$. Particularly the appropriate time slot queue $TSQ_i$ for a (subsequent) data packet $P_i$ is given by $TS_{current}+N$ (packetsize of $p_i \times 8$/bitrate of $P_i$ subflow); (Modulo$_n$ [$TS_{current}+N$ (packetsize×8/bitrate)]). Particularly the sorting time for sorting a data packet into a timeslot queue is constant and independent of the number of subflows.

According to the present invention it will thus be possible to obtain a per-flow, or rather per-subflow, control, e.g. providing traffic conditioning on maximum bit rate. For that purpose it is important how the scheduling or sorting is performed or which scheduling algorithm is used. For example, for a large number of flows, the WFQ as referred to above would give a computational overhead increasing as ordo (log n). Another known scheduling algorithm is Leap Forward Virtual Clock (LFVC) which has a computational overhead increasing as ordo(log(log n)). For these scheduling methods it appears to be one main contributor to the increasing computational overhead with the number of queues and that is the required sorting of packets based on time stamps. However, according to the present invention the computational overhead will be constant and it does not depend on the number of queues, and this means that it actually is an ordo(I)algorithm, particularly specialized for the IP packet handling.

Particularly the packets are IP-packets, and the maximum bandwidth can be provided per-subflow of IP-packets, e.g. traffic conditioning on maximum bitrate for each subflow.

In an advantageous implementation, although the inventive concept is not limited thereto, the data packets that are linked into one and the same time slot queue (from different subflow queues) are arranged in an arbitrary order in the time slot queue.

The arrangement may be provided in a traffic node in an IP network. Particularly it is provided in a core network node if flow control is implemented for packet data traffic between external packet data networks and end users over a backbone/ core network. The arrangement may be implemented for data packet traffic on the downlink, e.g. from servers of packet data networks towards end users. Particularly the arrangement is arranged in a traffic node, or a packet data node, upstreams of equipment, links, network nodes etc. that need to be protected from overload situations or which better should not need to too large storing means. Particularly it may be provided at the ingress point to the core network or before the ingress node to the radio network, since often the radio link is the weakest link of the system and therefore needs to be protected since it is a scarce resource with a limited bandwidth. Also other selection criteria can be used for determining where the arrangement best serves its purpose. Flow controlling arrangements may be provided in a plurality of network nodes of the same type or of different types. For example in case different operators are responsible for different nodes or different networks flow controlling arrangements may be installed in network nodes belonging or controlled by different operators. However, also other aspects may be considered. Flow control may alternatively, or additionally be provided for on the uplink.

Particularly there are a plurality of flow controlling arrangements in a traffic node.

In a particular implementation a subflow is defined or given by the address of the receiving end user and the packet content. Particularly it is defined by the end user address (IP-address), the QoS class of the packet, for example streaming, conversational, background or interactive. It may also be given by the IP-address of the destination user equipment or end user, the originating address, e.g. a server or particularly a web-server or a streaming server, and the service class or QoS the end user subscribes to.

In a particular implementation the communication system comprises an UMTS system and the arrangement is preferably provided in a traffic node of said system. Particularly a subflow may be defined by a GTP-tunnel or a PDP-Context (secondary or not). In an advantageous implementation, for each service class an end user, e.g. a user equipment (UE), subscribes to, one subflow is defined. The arrangement may with advantage be provided in a traffic node, e.g. a GGSN (Gateway GPRS Support Node) and/or in an SGSN (Serving GPRS Support Node) upstreams in the flow direction of the subflows with respect to a network part needing to be protected or a link, e.g. a radio link having severe bandwidth requirements.

In particular implementations the arrangement is able to handle a large number of subflows, e.g. up to $10^3$, $10^4$, $10^5$, $10^6$ or more subflows, e.g. GTP-tunnels. It should be clear that this merely is an example. Moreover there may be any number of arrangements, as referred to above, in a network node, e.g. implemented on circuit boards. Also the number of time slots in the array register can be selected according to different criteria, and particularly it is given by technical considerations or limitations. Generally all the data packets in a time slot queue will be output on the output device within a T/N-th second, resulting in a slight varation in delay. If a specific delay variation (jitter) is required, this may be achieved by selecting N (the total number of time slots) sufficiently high. This is generally a trade off between delay variation and memory usage.

The present invention also provides for a traffic node in a communication system supporting communication of packet data within IP-networks or between external packet data networks, or generally data packet suppliers, e.g. IP networks, or more specifically servers, and end users over a backbone (core) network. The traffic node comprises a number (J) of arrangements, for controlling the flow of data packets. Each flow controlling arrangement comprises or communicates with classifying means for, based on a number of parameters, defining a number of packet subflows from the total input flow of data packets handled/directed to the respective arrangement.

Each arrangement comprises first and second queueing means for, using individual data packet holding times given by the size of the respective data packets and by the desired bandwidth of the subflow to which the respective data packet belongs, controlling the data packet traffic flow on a per-subflow basis. The, or a number of the, flow control arrangements are used to control the traffic flow on the downlink (and/or on the uplink). Particularly the first queueing means of each flow controlling arrangement comprises or generates one subflow queue for each subflow, such that data packets received in the respective arrangements are placed in the appropriate subflow queue, whereas the second queueing means of each flow controlling arrangement comprises at least one circular timeslot array register, wherein for each timeslot a timeslot queue is provided. Data packets from the subflow queues are placed in the appropriate time slot queues of the respective second queueing means in relation to a current timeslot queue, the packets in which, if any, currently being output, such that the holding times of the respective data packets at least substantially will be observed.

The holding time requirements are particularly given by the desired bandwidth usage of the respective subflow to which the packet belongs and packet size. Maximum one data packet from each subflow queue is contained in the second queueing means of an arrangement simultaneously, and when a data packet is output from the time slot queue in which it is placed, i.e. when the time slot forms a current time slot, the subsequent data packet in the subflow queue from where it originated, if any, is placed in the appropriate time slot queue such that the holding time of the preceding data packet will be observed. Particularly each second queueing means comprises an array of $N_j$ time slots of each a given time interval $t_j$, such that $N_j$ time slot queues are provided, wherein $T_j$ is the time interval of the $N_j$ time slots. When a current time pointer points at the current time slot, all the data packets in the corresponding time slot queue are output. The current time slot pointer is displaced one step forwards every $T_j/N_j$ seconds, or alternatively somewhat later, if not all packets can be output within $T_j/N_j$. As discussed earlier, the appropriate time slot queue for a subsequent data packet may, in one implementation, be given by the current time slot+N (the packetsize of the packet*8/bitrate of the respective subflow). The appropriate time slot queue may however be calculated in other ways as well. It should be clear that index j can be different for different second queueing means, irrespectively of whether they are in the same flow controlling arrangement or not. I.e. the number of and the length of time slots may differ.

In a particular implementation the traffic node comprises a GGSN or a SGSN in GPRS/UMTS and even more particularly a subflow is defined as a GTP-tunnel or a PDP context. Particularly the desired bandwidth, the maximum bandwidth usage, for a subflow may be given by the link having the most severe bandwidth requirements on the path between e.g. a server of the external packet data network, particularly a streaming server or a web-server, and an end user station, e.g. a User Equipment (UE). In other terms the desired bandwidth for a subflow corresponds to the maximum bit rate the particular subflow should have with respect to the maximum allowed bandwidth usage in e.g. a given part of the network, or on a given link.

The present invention also provides for a method of packet data flow control in a communication system supporting communication of packet data. The method particularly comprises the steps of; defining, based on a number of parameters, a number of subflows among the total flow of packets incoming to a flow controlling arrangement; placing the data packets incoming to the flow controlling arrangement in subflow queues, such that there is one subflow queue per subflow; determining an individual holding time for each data packet of a subflow depending on the size of the data packet and on the desired bandwidth of the subflow to which the packet belongs, or alternatively the maximum bit rate, or more generally the bit rate the flow should have; transferring data packets from each subflow queue to second queueing means comprising one or more circular time slot array register(s) with one time slot queue per time slot by, for each subflow, consecutively placing the first data packet of the subflow queue in the appropriate time slot queue as e.g. given by the holding time of the preceding packet in relation to the current time slot, the packets in which currently being output, such that always maximum one data packet from one and the same subflow is queued in the second queueing means.

Particularly the second queueing means comprises an array of N time slots, each time slot defining a time interval $t_i$, such that N time slot queues are provided, wherein T is the total time interval of the N time slots. Alternatively the second queueing means comprises two or more timeslot array registers.

Particularly the step of outputting packets stored in the current time slot queue is carried out by; using a pointer to point at a time slot for activating output of the packets stored in said time slot, which thus forms the current time slot; moving the time slot pointer one step forwards every T/N seconds (or alternatively when all packets have been output, but no sooner than after T/N seconds). The method particularly further comprises the steps of; for each data packet output from a time slot queue; placing the subsequent data packet from the same subflow queue as the output packet (if any) in the appropriate time slot queue for that subsequent packet. Finding the appropriate time slot in one implementation comprises the step of; calculating the appropriate time slot queue ($TSQ_i$) for a (subsequent) data packet $p_i$ as the sum of the current time slot and N (packet size of the preceding data packet $P_{i-1} \times 8$/the bitrate of the subflow). Preferably the step of defining subflow queues comprises defining one subflow per GTP tunnel in a GPRS/UMTS system.

It should however be clear that subflows can be defined in different manners, but generally there is one subflow per end user, e.g. User Equipment (UE) and particularly also per service class, e.g. one subflow per QoS class an end user subscribes to, such that, if an end user for example subscribes to three different service classes, there may be one subflow for each service class or QoS class. There may also be one subflow corresponding to for example two different service classes (QoS classes).

It is also possible to implement flow control as described above in a cascaded manner such that for example in a first flow controlling arrangement there is one definition of subflows, it may for example relate to more than one service class or more than one end user, whereas in a subsequent flow controlling arrangement a finer or different subflow division is implemented etc. Any alternative is in principle is possible.

BRIEF DESCRIPTION OF THE DRAWINGS

The invention will in the following be further described in a non-limiting manner, and with the reference to the accompanying drawings in which.

DETAILED DESCRIPTION OF THE INVENTION

Figure 1:
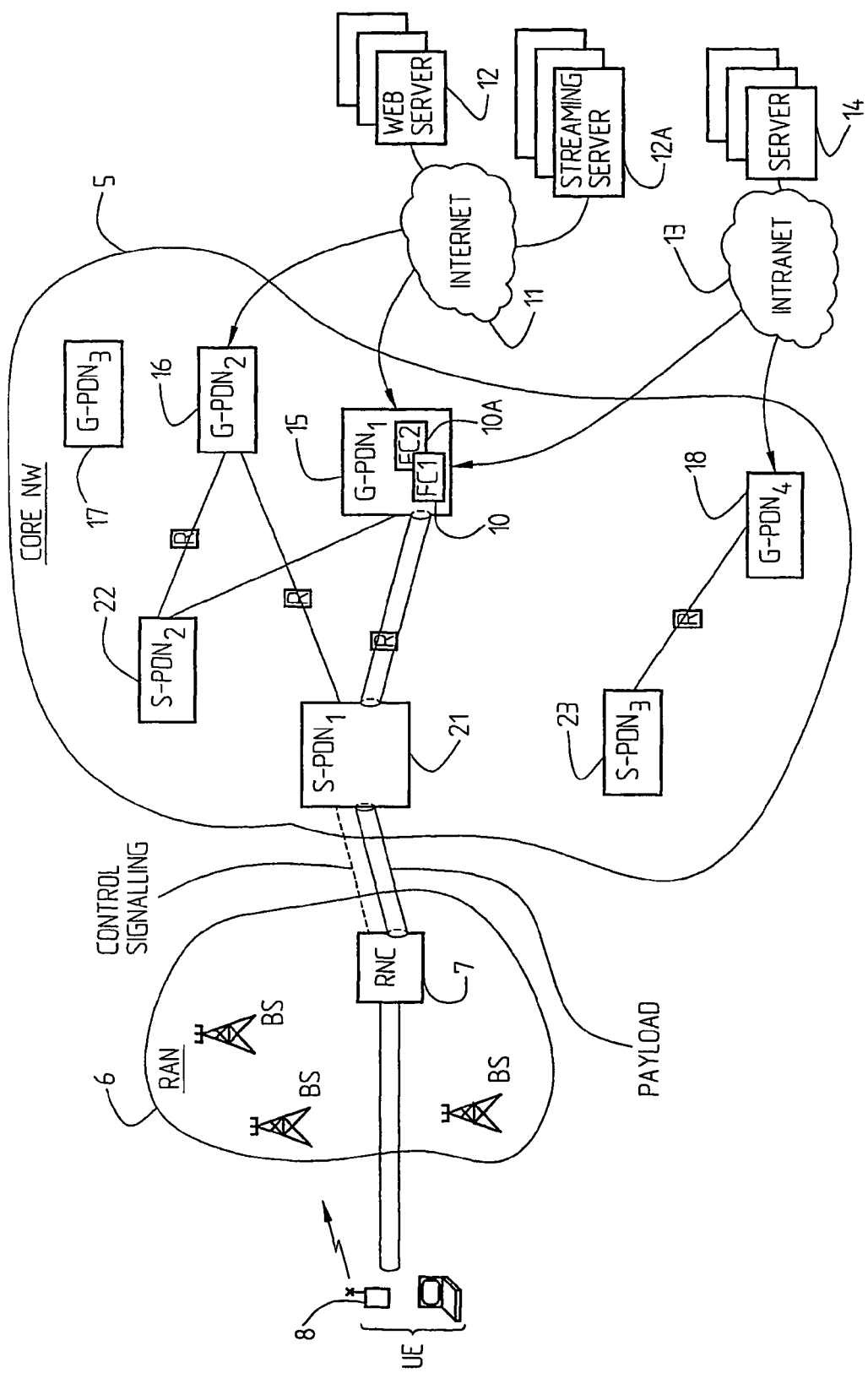
FIG. 1 illustrates the arranging of some flow controlling arrangements in a communication system according to one embodiment of the invention.

FIG. 1 shows a communication system in which the inventive concept can be implemented. The communication system supports communication of packet data and it comprises a core network 5 and a number of radio networks, of which only one, RAN 6, is explicitly indicated in the figure. Each radio network RAN 6 comprises a number of base stations BS which are controlled by radio network control means RNC 7. In the figure an end user station or a user equipment UE 8 is illustrated which e.g. comprises a computer connected to a mobile station, which here connects to RNC 7. Packet data support node functionality in the core network 5 is provided by server packet data nodes S-PDN$_1$ 21, S-PDN$_2$ 22, S-PDN$_3$ 23 and gateway packet data nodes G-PDN$_1$ 15, G-PDN$_2$ 16 and G-PDN$_3$ 17, G-PDN$_4$ 18. Over the gateway packet data nodes communication is provided over external data networks, Internet 11, intranet 13 with web-servers 12, streaming servers 12A, or servers in general 14. It should be clear that the shown system merely is one simplified example of a system. The core network also comprises a number of routers R. The routers on the links of the backbone networks as well as routers at sites may be arranged in any appropriate manner. The connection to an external network can be provided through one or more gateway packet data nodes.

In this figure it is supposed that gateway packet data node G-PDN$_1$ 15 is provided with two flow controlling arrangements (FC1, FC2) 10, 10A. Of course there may be more than two flow controlling arrangements in G-PDN$_1$ 15, or it may contain just one flow controlling arrangement. Also the other packet data nodes, gateway packet data nodes as well as server packet data nodes, may be provided with flow controlling arrangements according to the present invention. Generally it is also possible to arrange flow controlling arrangements according to the present invention in other nodes, but flow controlling arrangements are preferably located at edge nodes.

Tunnels are schematically illustrated between G-PDN$_1$ 15 and S-PDN$_1$ 21 as well as between S-PDN$_1$ 21 and RNC 7, and between RNC 7 and user equipment 8 respectively. Tunnels are not a prerequisite for the functioning of the invention. However, bandwidth information is often available per flow (subflow) in tunnel configurations, like GTP.

It is here supposed that the flow controlling arrangements 10, 10A are provided in order to control packet data traffic on the downlink. Often it is particularly important to protect the radio link from being overloaded since it is an expensive resource having a limited bandwidth capacity. Generally one radio channel is reserved for each user and it is not possible to transport packets faster than it is allowed to on that channel. However, through providing for flow control according to the present invention at e.g. a core network gateway node it will not be necessary to keep control over packet flows within the core network or in the backbone network, which also is clearly advantageous. Problematic situations often result when for example streaming servers or web-servers keep on sending data packets or bursts thereof on the downlink with a high capacity or at a high speed, which particularly may be much too high as compared to what can be handled within the core network, and specifically by the RNC and on the radio link.

According to the invention it gets possible to perform data traffic control on a per subflow basis, e.g. per user, or per user and QoS class or service class. However, it is possible, according to the inventive concept, to define subflows also according to other, different or additional criteria. A subflow may e.g. be given by source and destination IP addresses and UDP or TCP port, possibly QoS class or set DiffServ byte.

Generally it is disadvantageous to buffer data packets in the radio network control means 7 since they do not have enough storing capacity and therefore, according to the present invention, buffering is done for example in gateway packet data nodes (and/or in server packet data nodes). It will also be easier to provide for a satisfactory network dimensioning with such a flow controlling capability at an early stage on the downlink.

The per (sub)flow control of bandwidth according to the invention will make it possible for operators (ISP; Internal Service Providers, UMTS etc.) to make service offerings and charging based on the subscribed bandwidth. The invention does also, potentially, solve other problems in IP-networks which may be caused by the often bursty nature of IP-traffic.

Figure 2:
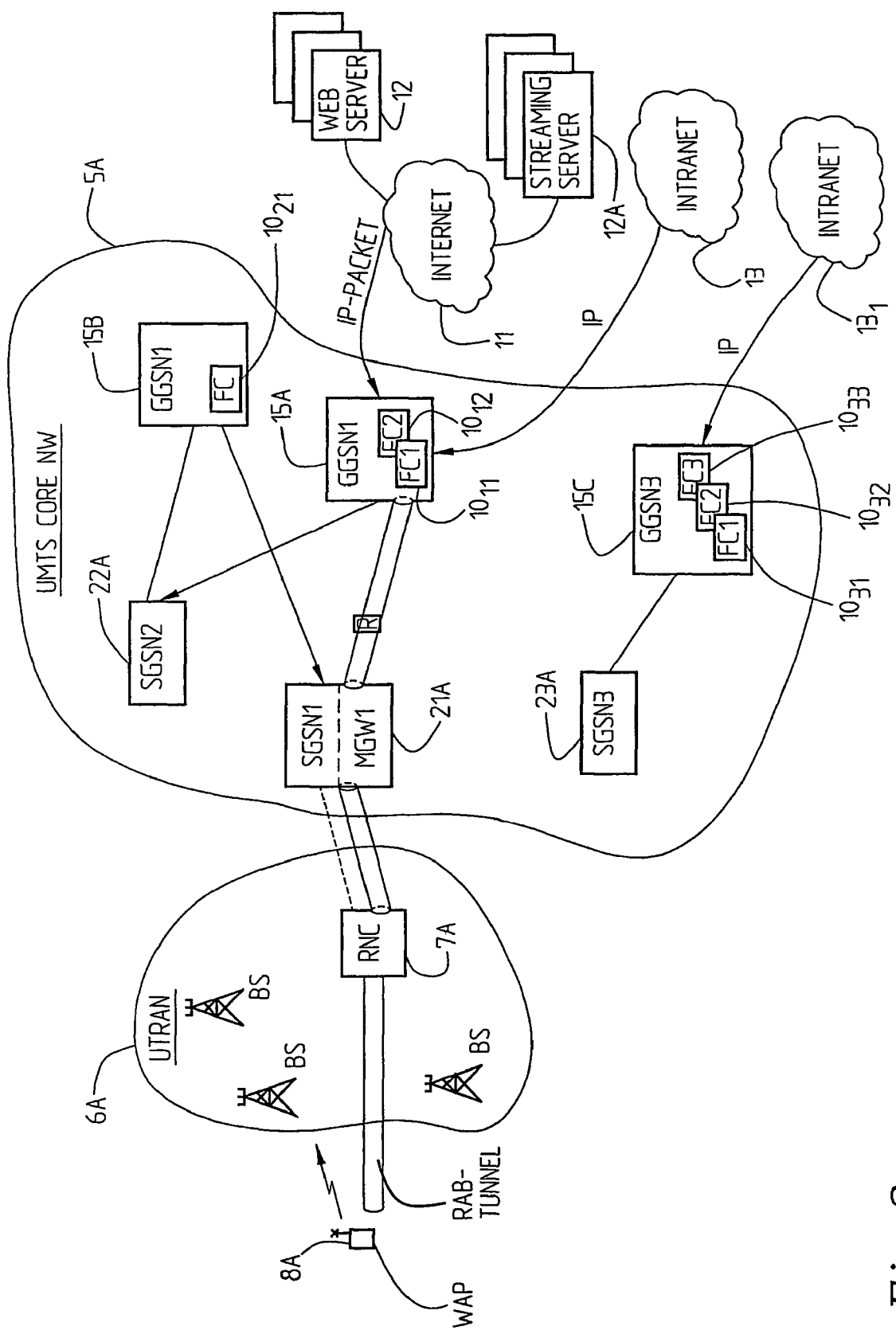
FIG. 2 is a figure similar to that of FIG. 1 with flow controlling arrangements provided in an UMTS system.

FIG. 2 shows an implementation of the inventive concept to UMTS. Packet data support nodes here comprise SGSNs (Serving GPRS Support Node) which may be divided or decomposed into an SGSN server node and a media gateway (MGW) cf. SGSN$_1$ and MGW$_1$, 21A. In other aspects the figure is similar to that of FIG. 1. The UMTS core network 5A comprises gateway GPRS support node GGSN$_1$ 15A with two flow controlling arrangements 10$_{11}$, 10$_{12}$, FC1 and FC2, which particularly may be provided on each a circuit board. Also GGSN$_2$ 15B comprises a flow controlling arrangement FC 10$_{21}$ and GGSN$_3$ 15C comprises three flow controlling arrangements 10$_{31}$, 10$_{32}$, 10$_{33}$. Three SGSN nodes SGSN$_1$ 21A, SGSN$_2$ 22A and SGSN$_3$ 23A are illustrated; however, only for SGSN 21A the media gateway is explicitly illustrated. The radio network comprises an UTRAN 6A (UTMS Terrestrial Radio Access Network) with a radio network control means RNC 7A. The user equipment here is supposed to comprise a WAP-telephone 8A. It should however be clear that also in this case a user station comprising a PC and a mobile station could be used, just as FIG. 1 of course is applicable to e.g. WAP-telephones. Although not explicitly illustrated in FIG. 2, it is also possible to include a flow controlling arrangement (or more) also in one or more of the SGSNs.

Although the implementation of flow control according to the invention is mainly described with reference to downlink traffic, it should be clear that the concept is likewise applicable on the uplink. Uni-directional flow control may thus be implemented in either direction, but also bi-directional flow control may be implemented.

In FIG. 2 it is however supposed to be implemented on the downlink. Data packets are input by servers over for example Internet 11, intranets 13, 13$_1$. Also in this case tunnels are indicated, point-to-point or direct. For example for UMTS the tunnel on the radio link comprises a 64 kbps RAB, Radio Access Bearer. According to the present invention the traffic flow will here be controlled at a much earlier stage, upstreams of the radio link, and already at for example GGSN$_1$ 15A measures will be taken to assure that the bandwidth requirements on RAB will be upheld through flow control on a per subflow basis.

In one implementation a subflow is defined as an IP address of the user equipment and the relevant QoS class. Thus, if the subscriber or end user subscribes to more than one QoS class, there may be more than one subflow, e.g. one for each QoS class, for one and the same end user. Preferably flow control is performed on a per subflow basis, where a subflow e.g. corresponds to a GTP tunnel. GTP is the GPRS tunneling protocol for example described in ETSI Draft TS 100 960, V5.0.0 (1998-01). In one advantageous implementation every circuit board in a GGSN is able handle a large number of 10.000 GTP tunnels, e.g. up to $10^2$, $10^3$, $10^4$, $10^5$, $10^6$ or more tunnels depending on board capacity, each of which e.g. controlled as a subflow. According to the invention, particularly if it is implemented to control the radio link, the subflow controlling procedure is preferably performed already in GGSN, thus particularly protecting the RNC 7A and the core network in general. In more general terms a flow controlling arrangement or a flow control procedure as described in the present invention may e.g. be provided for upstreams of, and in the flow direction (uplink or downlink) of the weakest link/network entity, e.g. the link having the smallest bandwidth or the entity or the link most sensitive to traffic overload. However for the purposes of service offering control, subscription based control, it may be placed at an arbitrary node (nodes) in the network.

For concepts, terminology etc., that are used herein, it is referred to 3GTS 23.060 V3.4.0 (2000-07), Technical Specification by 3GPP (Third Generation Partnership Project) which herewith is incorporated herein by reference thereto. 3GPP TS 23.107 V.3.4.0 (2000-10) Technical Specification by Third Generation Partnership Project (3GPP™), Technical Specification Group Services and System Aspects; QoS Concept and Architecture is also herewith incorporated herein by reference.

It should be clear that the inventive concept is applicable also in IP-based networks, e.g. within a network. In the following one example of a flow controlling arrangement according to the present invention will be further described. According to the invention it gets possible to control the bandwidth usage on a per subflow basis.

Figure 3:
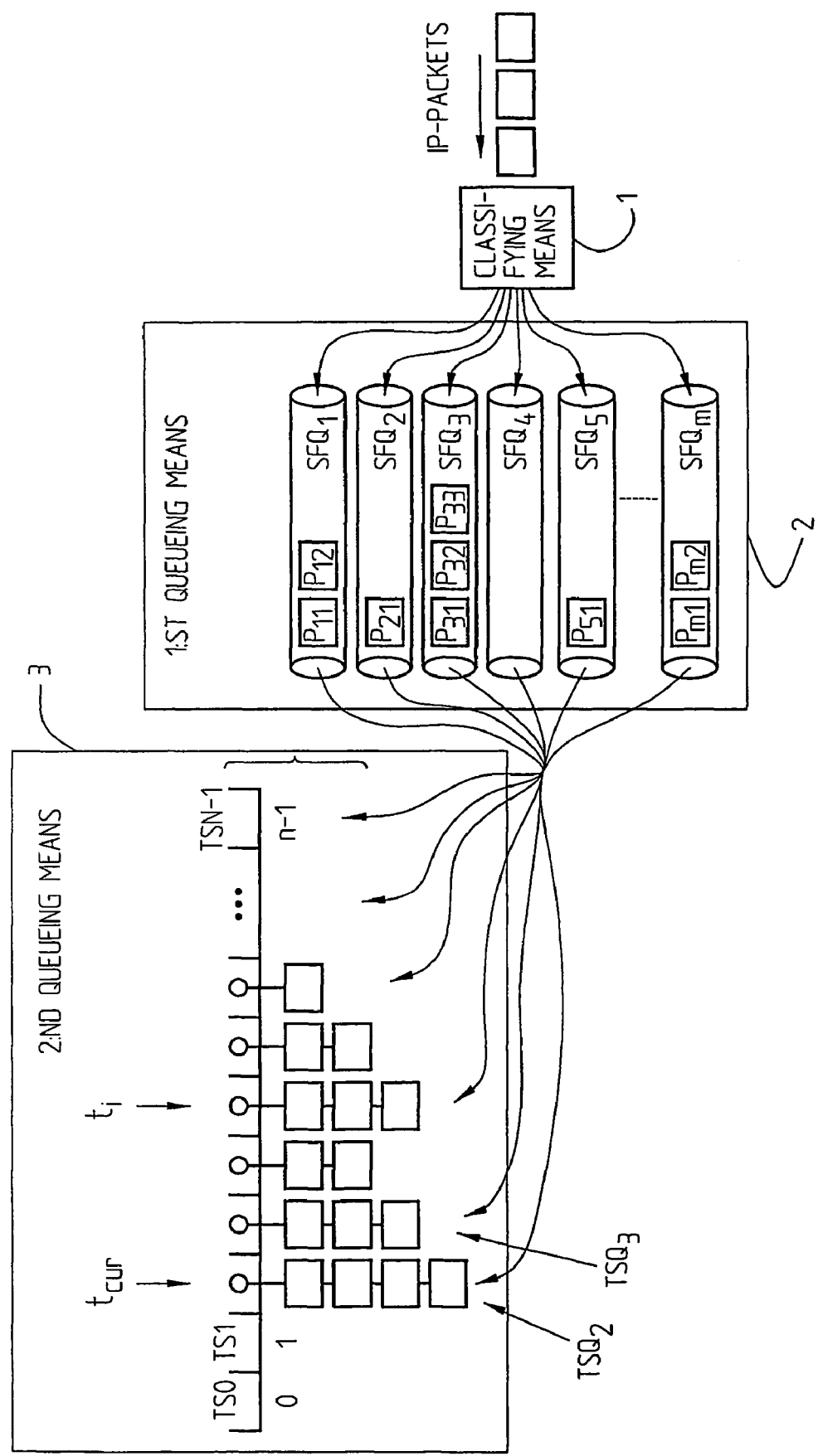
FIG. 3 illustrates, in a simplified manner, an arrangement according to the invention comprising first and second queueing means.

In FIG. 3 a flow controlling arrangement 10 is schematically illustrated. It is supposed that a number of IP packets are input to the flow controlling arrangement 10, which comprises classifying means 1 for determining or defining a number of subflows. This can, as referred to above, be done in many different ways, e.g. per end user, per end user and service class etc. As the classification of the subflows is determined, the input IP packets are arranged in first queueing means comprising a number (m) of subflow queues $SFQ_1 \ldots SFQ_m$. In this embodiment data packets $P_{11}$ and $P_{12}$ are in $SFQ_1$ whereas $SFQ_2$ only comprises one packet $P_{21}$. $SFQ_3$ comprises three packets in a queue, $P_{31}$, $P_{32}$, $P_{33}$, whereas $SFQ_4$ is empty, $SFQ_5$ comprises one packet $P_{51}$ and $SFQ_m$ comprises two packets, $P_{m1}$, $P_{m2}$, at a given moment in time.

IP packets arriving at the input queues (the first queueing means) shall be delayed or held a specific time, here denoted a holding time, before they are put on the output queue, or output from the second queueing means. The holding time depends, according to one embodiment of the invention, on the maximum bit rate the IP subflow should have and on the size of the individual IP packet. Particularly the holding time of a packet (given by the bit rate the corresponding packet subflow should have and on the size of the packet) is used to indicate the time to hold the subsequent packet from the same subflow queue i.e. it indicates the time interval between output of the two packets.

The second storing means comprises a circular time slot array register in which a time interval T is divided into N smaller time intervals denoted time slots, TS 0, TS 1, ..., TS N−1. If for example T=1 second, and N=1000, each time slot in the array register will represent 1 ms. For each time slot packets may be arranged in a time slot queue $TSQ_1$, $TSQ_2$, ..., $TSQ_{N−1}$. Thus there are N time slot packet queues. A current time slot pointer $t_{cur}$ points at the current time slot and thus at the current time slot queue, and it indicates that the packets in the current time slot queue are to be output. Every T/N seconds, e.g. in this embodiment every 1 ms, the current time slot pointer $t_{cur}$ pointer is moved one step forwards indicating the subsequent time slot queue to be emptied. Preferably the array is circular which means that the time slot after time slot TS N−1 is TS 0. Alternatively the time slot pointer is moved only when all packets in the current time slot queue have been output, if this occurs after T/N seconds.

The transfer of data packets from the first queueing means to the second queueing is carried out such that, preferably, at any time there is maximum one data packet from each subflow queue in the time slot array register. Preferably the individual holding times of the data packets, at least substantially, can be observed before output of a subsequent packet from the second queueing means. It should be clear that moving or transferring packets, e.g. between an incoming interface and the first queueing means, between the first queueing means and the second queueing means, from the second queueing onto an output interface or onto an output device can be achieved in different alternative ways, e.g. by moving pointers to packets, by copying packets etc.

If there is no data packet from a given subflow queue in the second queueing means at a given time, the first arriving data packet in that particular subflow queue can at once be introduced into the appropriate time slot queue. On condition that the holding time of the preceding packet from the same subflow queue actually has lapsed, the packet can be put into the current time slot queue, otherwise it has to be placed in a later TS queue, such that also the remainder of the holding time of the preceding packet will lapse before it is output.

However, the holding time as indicating the time to lapse before the subsequent packet is output, is particularly given by the packet size (in byte)×8 divided by the bit rate the subflow should have. The subsequent data packet of the same specific subflow queue can not be introduced into the time slot array register until the preceding data packet has been or is output from the time slot array register, i.e. the second queueing means. This will happen when the pointer points at the time slot queue in which it (the preceding packet) is placed. As the packet in the time slot queue in which it is placed are output, the originating subflow queue (i.e. the subflow queue from where the preceding packet arrangement) is checked for additional, subsequent packets. If there are additional packets in the specific subflow queue, the first data packet in the subflow queue is moved from the subflow queue to the correct time slot queue in the second queueing means as discussed above.

This is done for every data packet in a time slot queue pointed at by the current time slot pointer $t_{cur}$, and the respective subsequent packets in the respective subflow queues will be placed in the respective appropriate time slot queues. By using this way of sorting the data packets by time, the sorting time will always be constant (ordo(1)), which corresponds to the time to calculate the appropriate timeslot and linking a pointer to the packet into the time slot queue at the calculated index.

The calculation of an appropriate timeslot for each data packet and putting it into the appropriate time slot queue becomes a delay of each packet. Since the delay is a function of the bit rate this particular subflow shall have and the packet size of the preceding packet from the same subflow, the result will be a bandwidth shaped or a bandwidth controlled flow of IP packets. Furthermore, since the sorting time is constant, ordo(1) as referred to above, it can be applied in large scale environments without any performance reduction, which is extremely advantageous. Preferably an upper limit is given for packet size as well as a lower limit for subflow bit rate. This will result in a finite length of the time slot array register. However, in practice such limits do not give rise to any problems.

Figure 4:
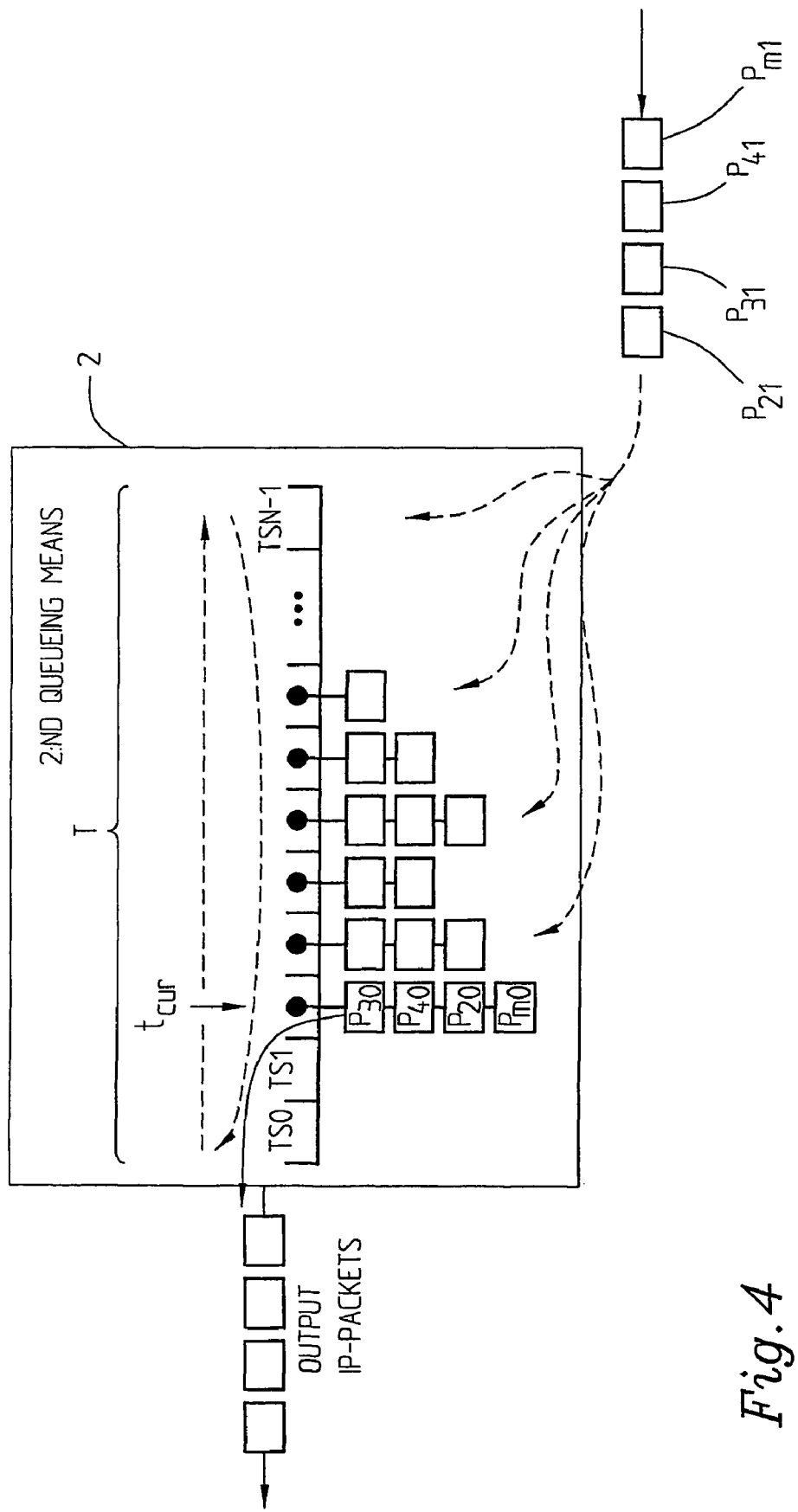
FIG. 4 illustrates input and output of data packets to the second queueing means.

FIG. 4 illustrates the output of the data packets $P_{30}$, $P_{40}$, $P_{20}$, $P_{m0}$ in time slot queue $TSQ_2$ which is pointed at by the current time slot pointer $t_{cur}$. Upon removal of the packets in $TSQ_2$, the respective originating subflow queues $SFQ_{30}$, $SFQ_{40}$, $SFQ_{20}$, $SFQ_m$ are checked for additional packets. It is here supposed that in each of the subflow queues $SFQ_{20}$, $SFQ_{30}$, $SFQ_{40}$, $SFQ_m$ there is at least one subsequent packet and these packets, $p_{21}$ from $SFQ_2$, $P_{31}$ from $SFQ_3$, $P_{41}$ from $SFQ_4$ and $P_{m1}$ from $SFQ_m$ are input to the time slot array register, i.e. the second queueing means after calculation of the respective appropriate time slot queues. In this figure it is not illustrated which the appropriate time slot queues are for these packets. This will be further explained among others with reference to FIGS. 5A, 5B below, which illustrate one example on how the concept of holding times can be implemented.

Figure 5A:
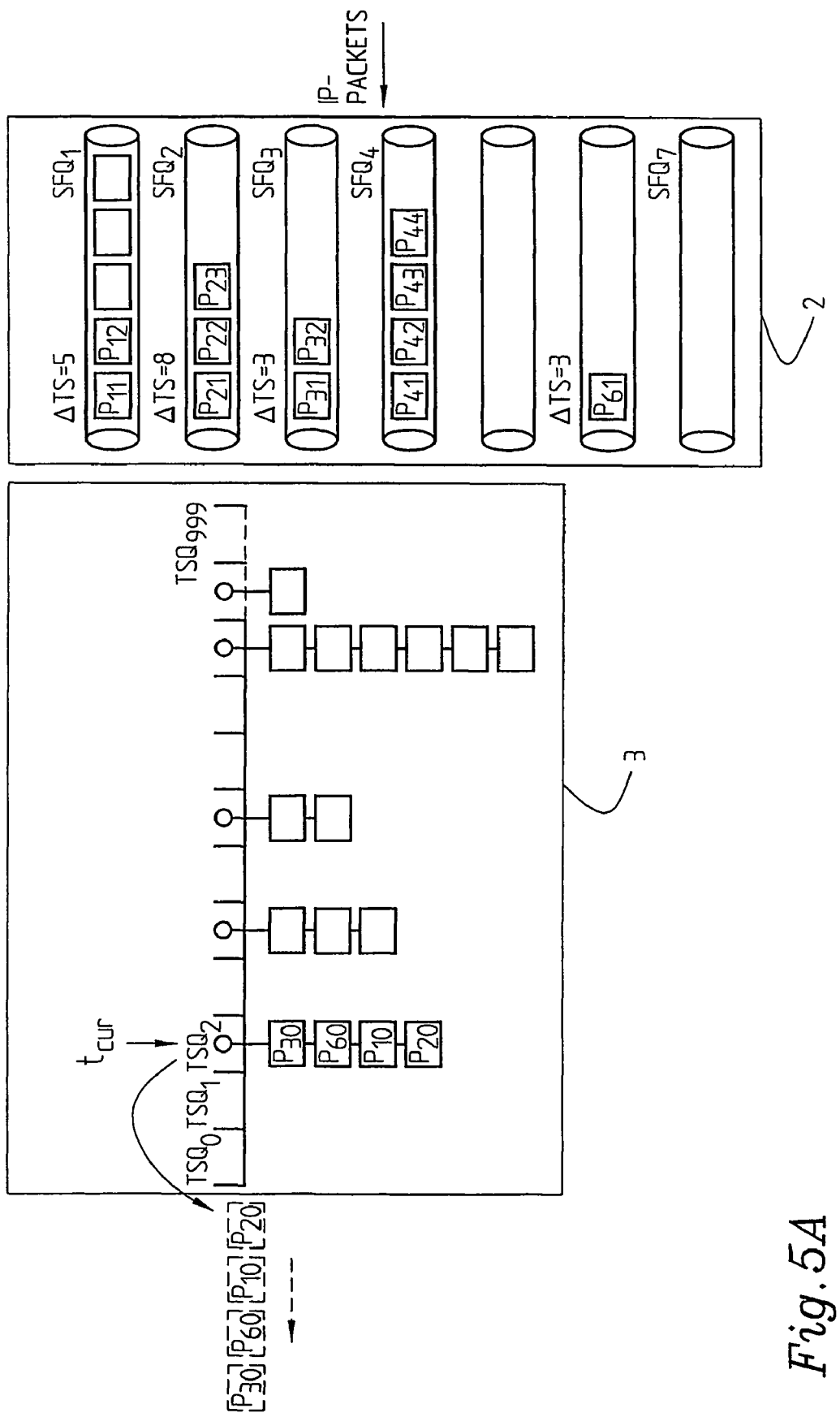
FIG. 5A illustrates somewhat more in detail data packets in the second queueing means originating from particular subflow queues just before output of data packets from a current time slot queue.

FIG. 5A shows a first queueing means 2 comprising a number of subflow queues and a second queueing means 3 comprising a time slot array register, which is circular, with, in this case, 1.000 time slot queues $TSQ_0$, $TSQ_1$, $TSQ_2$, ..., $TSQ_{999}$. In the first queueing means 2 $SFQ_1$ contains a number of packets $P_{11}$, $P_{12}$, $P_{13}$, $P_{14}$, $P_{15}$. In a similar manner the second subflow queue $SFQ_2$ contains packets $P_{21}$, $P_{22}$, $P_{23}$, $SFQ_3$ contains packets $P_{31}$, $P_{32}$ and $SFQ_4$ contains packets $P_{41}$, $P_{42}$, $P_{43}$, $P_{44}$. In $SFQ_5$ there are no packets and in $SFQ_6$ there is one packet waiting in the queue, $P_6$. Also in $SFQ_7$ there are no packets.

In the time slot queue array register $t_{cur}$ points at $TSQ_2$ containing packets $P_{30}$, $P_{60}$, $P_{10}$, $P_{20}$. These packets are thus about to be output. It is here supposed that $P_{11}$ in $SFQ_1$ should be delayed five time slots in relation to the current time slot, i.e. $\Delta TS=5$, whereas for $P_{21}$ $\Delta TS=8$, for $P_{31}$ $\Delta TS=3$ and for $P_{61}$ $\Delta TS=3$. The respective $\Delta TS$ values are found by use of the holding times of the respective preceding packets from each subflow queue, and actually indicate how much $P_{11}, P_{21}, P_{31}, P_{61}$ should be delayed with respect to the output time of $P_{10}, P_{20}, P_{30}$ and $P_{60}$ respectively.

The correct time slot to which a subsequent data packet should be transferred is actually given by or calculated as:

$$timeslot_{ti} = Modulo_n, [timeslot_{tcur} + N \text{ (packetsize of preceding packet} \times 8/\text{bit rate)}]$$

i.e. in this case $timeslot_{tcur}$ would be $TSQ_2$, but since this figure neither illustrates the packet sizes, nor does it illustrate the bit rates of the respective subflows and therefore, for explanatory reasons the appropriate time slot is merely indicated by a $\Delta TS$ value being the difference from the current time slot to the time slot where the packet should be placed.

Figure 5B:
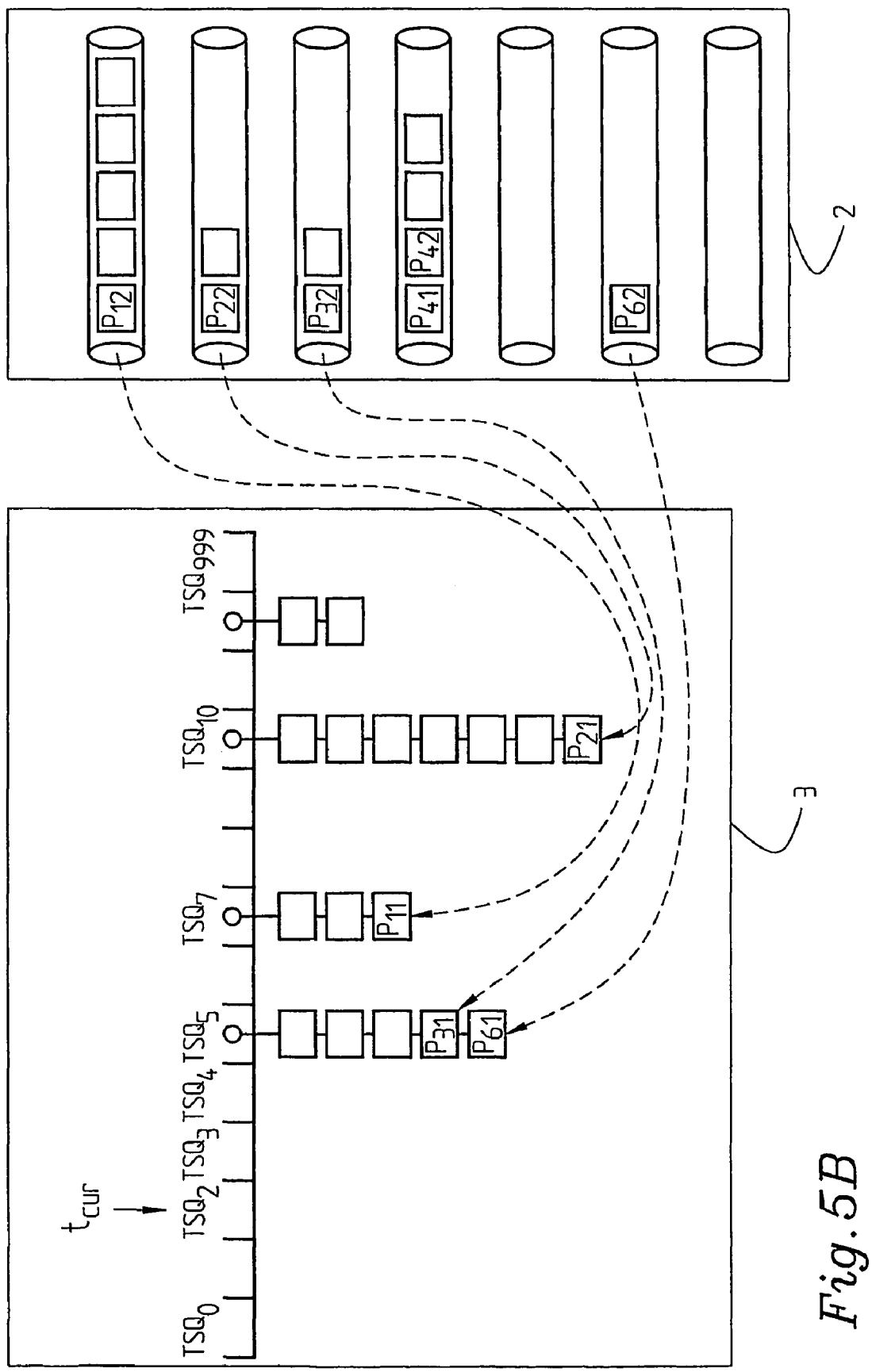
FIG. 5B illustrates one way to input subsequent data packets from the respective subflow queues at output of the data packets from the current time slot queue of FIG. 5A.

Thus, in FIG. 5B it is supposed that $TSQ_2$ has been emptied but the time slot pointer still points at $TSQ_2$ and the packets $P_{30}, P_{60}, P_{10}, P_{20}$ from $TSQ_2$ which were output, are replaced by $P_{31}, P_{61}, P_{11}, P_{21}$. Since for $p_{11}$ $\Delta TS$ was 5, $P_{11}$ is placed in $TSQ_7$ whereas for $P_{21}$ $\Delta TS=8$, $P_{21}$ is placed in $TSQ_{10}$, and for $P_{31}$ and $P_{61}$ $\Delta TS=3$ these packets are placed in $TSQ_5$. As $t_{cur}$ points at $TSQ_5$, $P_{32}$ and $P_{62}$ and possibly other data packets from other subflow queues will be input to their respective appropriate time slot queues etc.

The procedure as discussed above will result in a small inaccuracy in delay. Data packets that are linked into the same time slot queue can be placed in an arbitrary order. All the packets in one and the same time slot queue will be output within one T/N-th second, but generally it is not possible to obtain a more precise knowledge about when a particular packet actually is output. The minimum size of T as determined by the size of N is determined by the required accuracy of delay variance (or jitter). If a specific delay variation (or jitter) is required, this can be achieved by choosing a sufficiently high N. The selection of N is mainly a trade off between delay variation and memory usage.

Figure 6:
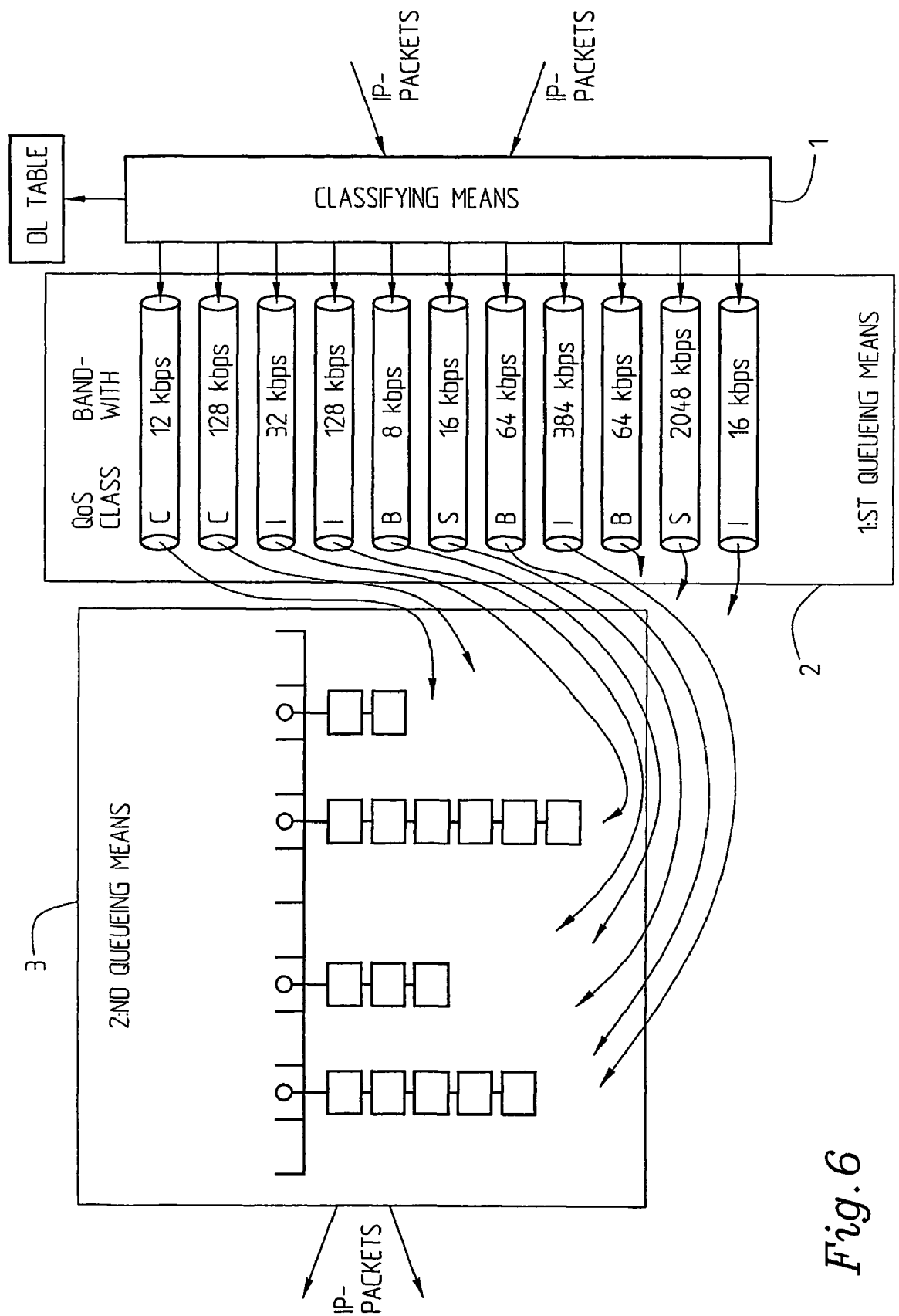
FIG. 6 illustrates one example of a circuit board comprising first and second queueing means.

FIG. 6 shows a specific example of an inventive arrangement implemented in a CPU or a circuit board, implemented in hardware or in software, comprising a flow controlling arrangement in UMTS according to the invention. In the classifying means subflows are defined. It fetches information from the downlink table, DL table, such as IP address, GTP TEID, TFT (Traffic Flow Template), Bandwidth, QoS class, performance counters etc. In the first queueing means a number of subflow queues are provided. In the respective subflow queues the respective bandwidths are given and the letters C,I,B,S indicate the UMTS QoS classes Conversational (C), Streaming (S), Interactive (I) and Background (B). Particularly the subflow queue size may depend on QoS class and for QoS class C it may be 10 ms, for QoS class S it may be 100 ms, for QoS class Interactive I it may be 1 s, and for Background it may be 10 s. It should be clear that these values are only given for exemplifying reasons, and other values may also, or better, be used. Packets in the respective subflow queues are then output as discussed above to the second queueing means, which merely is schematically illustrated in this figure since it was already discussed in FIGS. 3, 4, 5A, 5B how packets can be transferred from the first queueing means to the second queueing means.

Particularly tail drop TD may be used as a discarding algorithm if a subflow tends to get too long. Then the last packet(s) is/are dropped. However also other discarding mechanisms may be implemented. For example head drop may with advantage be used to get a faster back off if the flow e.g. is a TCP flow. Moreover a total bandwidth limit may be implemented for some QoS classes to allow for admission control. These figures are however merely given for exemplifying reasons.

It is also possible to have two (or more) second queueing means for one first queueing means. For example may one second queueing means handle UMTS QoS classes C and S (using UDP) and one second queueing means handle UMTS classes I and B (using TCP). This is schematically illustrated below in FIG. 7.

More generally there may be one second queueing means for each QoS class or one for a group of QoS classes, e.g. having same properties in common. Any criteria relating to the definition of subflows may be used to determine the use of different second queueing means.

In 3GPP TS 23.107 V3.4.0 (2000-10) "QoS Concept and Architecture" which is incorporated herein by reference, the UMTS QoS classes are defined. These classes are also referred to as traffic classes. The main distinguishing factor between these QoS classes is related to the delay sensitivity of the traffic. The Conversational class is intended for traffic which is very delay sensitive whereas the Background class is the most delay insensitive traffic class. Conversational and Streaming classes are mainly intended-to be used to carry real-time traffic flows. To which class traffic belongs, is mainly given by the delay sensitivity of the traffic. Conversational real-time services, like video telephony, are the most delay sensitive applications and such data streams should be carried in the Conversational class.

Interactive class and Background class are mainly meant to be used by traditional Internet applications like www, e-mail, telnet, FTP and News. Since the delay requirements are less severe, these classes provide better error rate by means of channel coding and retransmission. The main difference between Interactive and Background class is that the Interactive class is mainly used by interactive applications, interactive e-mail or interactive WEB browsing while Background class is meant for background traffic, e.g. background download of e-mails or background file downloading. Generally background applications use transmission resources only when interactive applications do not need them. This is an important factor in wireless environments where the bandwidth is low as compared to in fixed networks.

The most well known use of Conversational class is telephony speech, but with Internet and multimedia a number of new applications will require the Conversational class such as for example voice over IP and video conference tools. The real-time conversation scheme is characterized by that the transfer time shall be low because of the conversational nature of the scheme and at the same time that the time relation (variation) between information entities of the stream shall be preserved in the same ways as for real time streams. The time limit for acceptable transfer delay is very strict since otherwise the quality will be much too low.

The Streaming class uses a comparatively new scheme within data communication. It is characterized by that the time relations (variation) between information entities, i.e. samples, packets, within a flow shall be preserved, although it does not have any requirements on low transfer delay. But the delay variation of the end-to-end flow shall be limited to preserve the time relation or variation, between information entities of the stream. However, since the stream normally is time aligned at the receiving end, in the user equipment, the highest acceptable delay variation over the transmission media will be given by the capability of the time alignment functionality of the application. This means that the acceptable delay variations are much higher than the delay variations in the Conversational class.

The Interactive class for example relates to the case when an end user, either a machine or a human being, is on-line requesting data from remote equipment, e.g. a server. Examples thereon are WEB browsing, database retrieval, server access. This is a classical data communication scheme generally characterized by the request-response pattern of the end user. At the message destination there is an entity expecting the message (response) within a certain time. The content of the packet shall be transparently transferred with a low bit error rate.

The Background class scheme applies when an end user, typically a computer, sends and receives data files in the background. Examples are background delivery of e-mails, SMS, download of databases etc. Generally the destination does not expect to receive the data within a certain time. Thus this traffic class is generally comparatively delivery time insensitive. However, the content of the packets shall be transparently transferred, i.e. with a low bit error rate. Traffic of Interactive class may be bursty. For all four traffic classes a maximum bit rate bearer attribute is defined whereas guaranteed bit rate only is defined for Conversational and Streaming classes.

For Internet applications, the selection of the class and appropriate traffic attribute values is made according to the Internet QoS attributes. Internet applications do not directly use the services of UMTS, but they use Internet QoS definations and attributes which are mapped to UMTS Qos attributes at API (Application Programming Interface). Currently there are two main Internet QoS concepts, namely Integrated Services and Differentiated Services. Mapping between Internet QoS and UMTS QoS IP based QoS models shall be supported for PDP Context, meaning both Integrated Services signalled by RSVP (RFC 2205) and Differentiated Services (6-bit QoS attribute on each IP packet, DiffServ).

Figure 7:
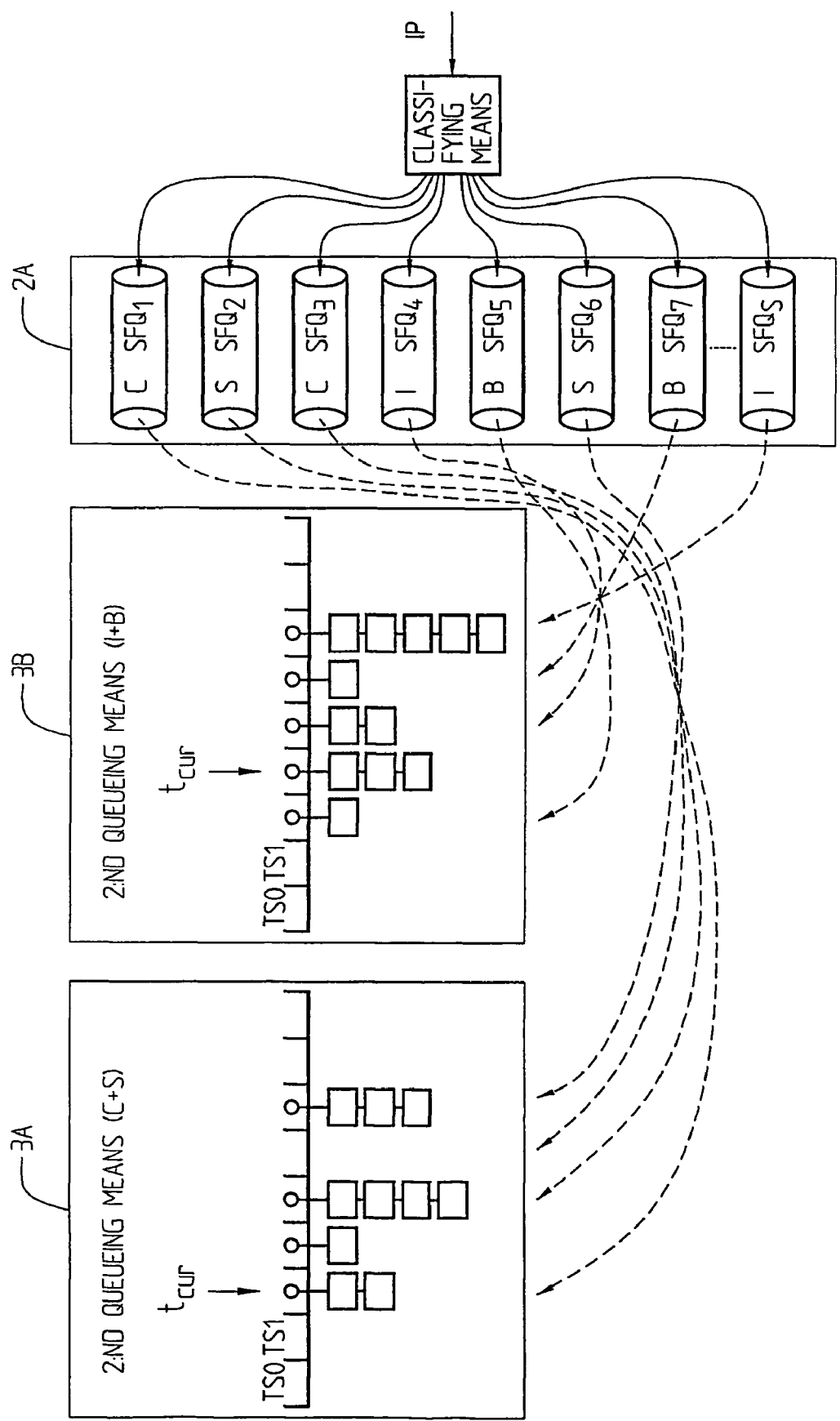
FIG. 7 illustrates a flow controlling arrangement according to an alternative embodiment of the invention.

FIG. 7 schematically illustrates an alternative implementation of a flow controlling arrangement. The flow controlling arrangement here comprises classifying means 1A, first queueing means 2A with a number of subflow queues $SFQ_1, \ldots SFQ_s$. It is here supposed that the classification also uses, here, the UMTS QoS class as a parameter for the definition of subflows. Here SFQ1 and SFQ3 are used for QoS class Conversational, SFQ2, SFQ6 for class Streaming, SFQ4 and $SFQ_s$ for class Interactive and SFQ5 and SFQ8 for class Background. The arrangement comprises two second queueing means 3A, 3B of which one, 3A, handles classes Conversational and Streaming, and the other, 3B, of which handles classes Interactive and Background. This means here that all packets from SFQ1, SFQ2, SFQ3 and SFQ6 are handled in dedicated second queueing means 3A, whereas all packets from SFQ4, SFQ5, SFQ8 and SFQS are handled in the other dedicated second queueing means 3B.

In other aspects the two separate dedicated second queueing means are similar to the second queueing means as disclosed in e.g. FIG. 3. Advantageously they operate asynchronously and independently. They may also have different lengths, different numbers of time slots, different lengths of time slots etc. Of course they may also be similar.

In still other implementations there may be one second queueing means per service class, or for any group of service classes (or subscriber groups, or groups determined by other criteria). The same concept is of course applicable to other service classes or QoS classes than the UMTS QoS classes. The principle remains also the same independently of which is the network or communications system used, namely that there is one first queueing means, but that there may be more than one second queueing means.

Figure 8:
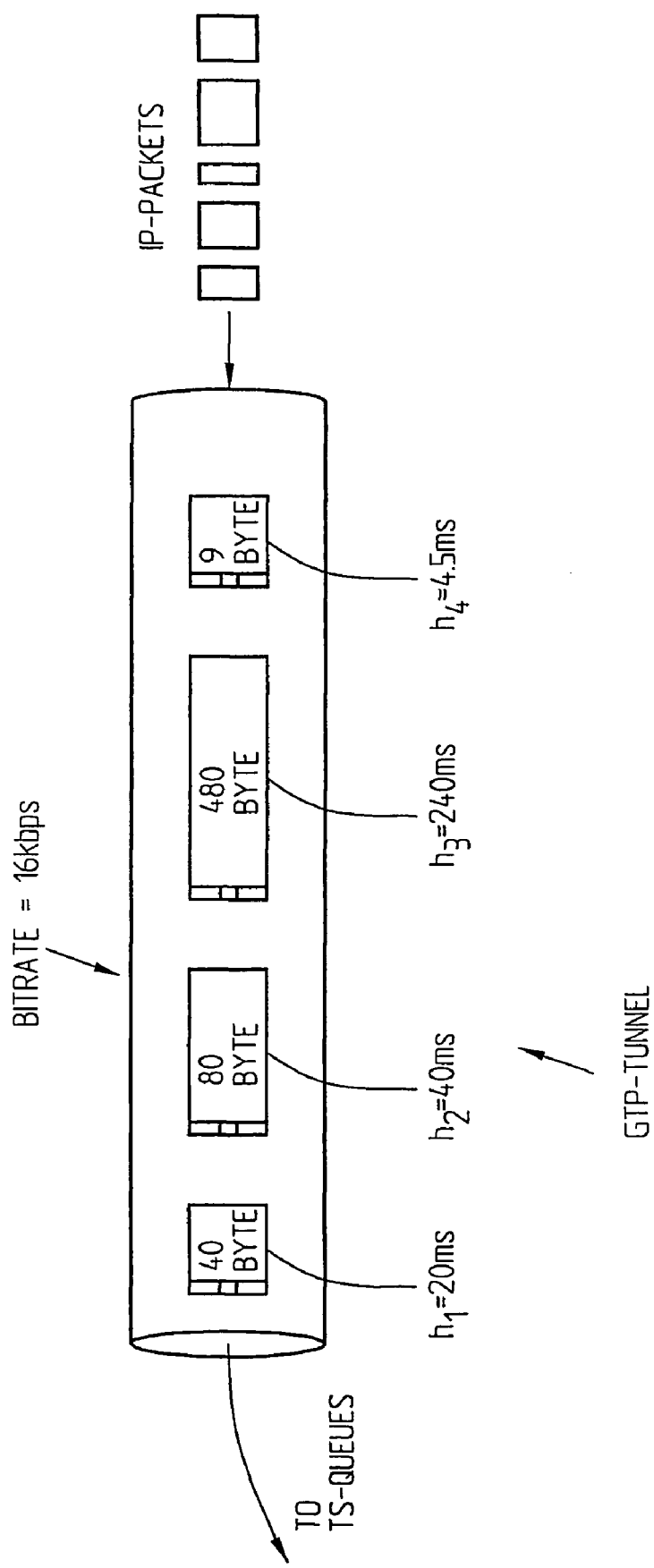
FIG. 8 illustrates one example of data packets in a subflow queue comprising a GTP-tunnel, FIG. 9 s a flow diagram describing an implementation of the inventive procedure when a packet is received in the first queueing means.

FIG. 8 shows one example on a GTP tunnel with queued IP packets of different sizes (one IP subflow with the terminology of the present invention). It is here supposed that the bit rate is 16 kbps. The first packet has a size of 40 byte, the second packet has a size of 80 byte, the third packet has a size of 480 byte whereas the fourth packet has a size of 9 byte. As an example the first 40 byte packet has a holding time, i.e. the time to wait before sending out the subsequent packet, of $h_1=(40\times8)/16.000$ s=20 ms. Similarly the holding time $h_2$ of the second packet is 40 ms, the holding time $h_3$ of the third packet is 240 ms whereas the holding time $h_4$ of the fourth packet is 4.5 ms.

Particularly the queue size may be limited as discussed above, for example 1 second for Interactive class etc., and tail drop may also be implemented as a discarding algorithm. This means that all arriving packets will be dropped if the number of bytes in queue exceeds 16.000/1/8=2.000 byte. Dropping of packets or similar for controlling the subflow queue size may however be done in any appropriate manner, e.g. by head drop.

Figure 9:
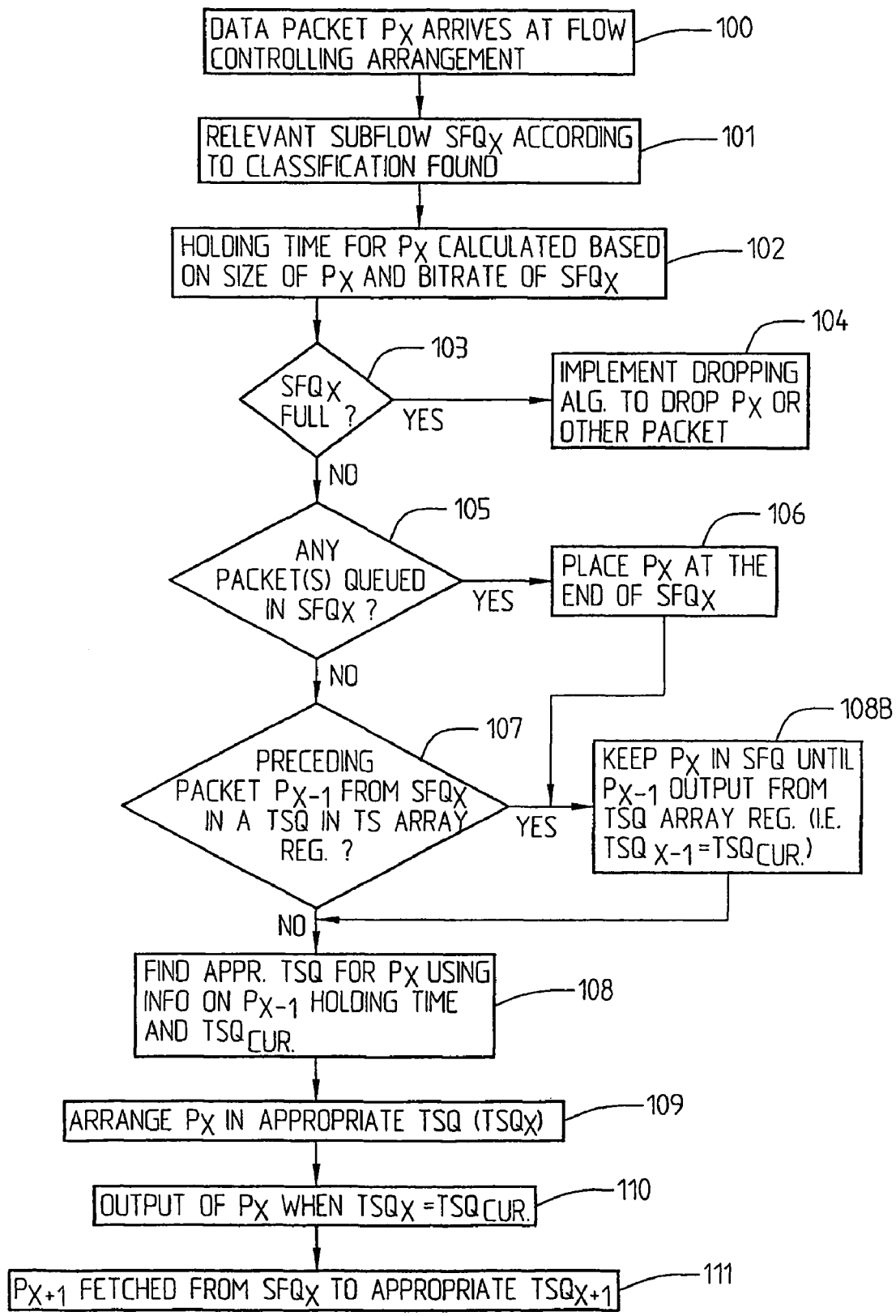

In the flow diagram of FIG. 9 the procedure when a data packet $P_x$ arrives on an incoming interface (it may e.g. be sent out by a streaming server or a web server). When thus the data packet $P_x$ arrives at a flow controlling arrangement according to the invention, 100, the relevant subflow queue $SFQ_x$ as determined by the classifying means has to be found, 101. Then the holding time of $P_x$ is calculated based on the size of $P_x$ and on the bit rate the subflow ($SFQ_x$) should have, 102.

The calculation of a holding time may however also be done at a later stage in the procedure, e.g when $P_x$ already is placed in $SFQ_x$, or when $P_x$ is to be output from the first queueing means (comprising $SFQ_x$). Still further, the holding time may be calculated at an even later stage, e.g. at steps 203,204 or 207 of FIG. 10.

The calculation of the holding time of $P_x$ may thus, according to another implementation, be done when $P_x$ has been placed in a time slot queue (TSQ) in the second queueing means, since, according to advantageous implementations the holding time of $P_x$ is used to determine when the subsequent packet ($P_{x+1}$) in the same subflow queue ($SFQ_x$) may be output in relation to when $P_x$ is output. I.e. in advantageous implementations the holding time of $P_x$ indicates the time that has to lapse between output (from the second storing means) of $P_x$ and of $P_{x+1}$ such that the bandwidth usage of the subflow can be controlled. The holding time concept may also be taken as an indication of the real time when $P_{x+1}$ may be output in relation to the output time of $P_x$, or alternatively in relation to the current time as indicated by the current time slot pointer indicating the current time slot of the second queueing means. Generally the holding time is used as a means to indicate in which the time slot the subsequent packet from the same subflow queue may be placed.

After (or before) calculating the holding time of $P_x$, it may be established if $SFQ_x$ is full, 103. If yes, some discarding algorithm may be used, e.g. a dropping algorithm deciding that $P_x$ is to be dropped or that some other packet is to be dropped, 104.

Then it is examined if any packet(s) is/are queued in $SFQ_x$, 105. It should be clear that step 105 could just as well be performed before step 103, which then only would have to be performed if the result of step 105 was affirmative, i.e. that there are one or more packets in $SFQ_x$.

However, supposing that there are no packets in $SFQ_x$ when $p_x$ arrives, then it has to be established if there is a packet ($P_{x-1}$) from $SFQ_x$ in the second queueing means, i.e. in one of the time slots of the time slot (TS) array register, 107.

If it is established that there is no packet ($P_{x-1}$) in the second queueing means, from $SFQ_x$, the appropriate time slot queue (TSQ) for $P_x$ has to be found. If the holding time of $P_{x-1}$ has lapsed in relation to current time, $TSQ_{cur}$, $P_x$ should be placed in $TSQ_{cur}$, i.e. it need not be held before output. If holding time $h_{x-1}$, has not lapsed, it has to be determined how many time slots the remainder of $h_{x-1}$ corresponds to, and add this number of time slots to $TS_{cur}$, which will result in the appropriate TSQ (denoted $TSQ_x$) for $P_x$, 108. $P_x$ will then be placed in $TSQ_x$, 109.

When the current time slot pointer $t_{cur}$ points at $TSQ_x$, i.e. $TSQ_x = TSQ_{cur}$, $P_x$ will be output like possible other packets from other SFQs that are placed in $TSQ_x$, 110. When $P_x$ is output, it will be indicated in any appropriate manner to $SFQ_x$ that there is no packet from $SFQ_x$ in the second queueing means. This may be done by actually indicating to $SFQ_x$ that there is no packet in the second queueing means or it may be passively indicated by the removal or absence of an indication, e.g. a flag, that there is a packet in the second queueing means from $SFQ_x$.

Alternatively the information about the absence or presence of a packet in any of the TSQs will have to be retrieved by $SFQ_x$. In one implementation, when $P_x$ is output, $P_{x+1}$, (if any) is automatically fetched from $SFQ_x$ to the appropriate time slot, $TSQ_{x+1}$ for $P_{x+1}$ using information about holding time of $P_x$ and $TSQ_{cur}$, 111. It should be noted that the denotation $TSQ_{x+1}$ has no other meaning than that it is the TSQ that has been established as the appropriate TSQ for $P_{x+1}$ as it will presumably be also for other packets from other subflow queues. The denotation is thus used only for explanatory reasons.

If at step 105 it was established that $SFQ_x$ contained one or more packets in the queue, $P_x$ is placed at the end of $SFQ_x$, 106. $P_x$ would then have to be kept in $SFQ_x$ until $P_{x-1}$ is output from the second queueing means, TSQ array register, i.e. when $TSQ_{x-1} = TSQ_{cur}$, 108B. This would also be the case if, at step 107, it was established that $P_{x-1}$, was still queued in the second queueing means. However, in both cases, when $TSQ_{x-1} = TSQ_{cur}$, is proceeded with step 108 as discussed above.

Figure 10:
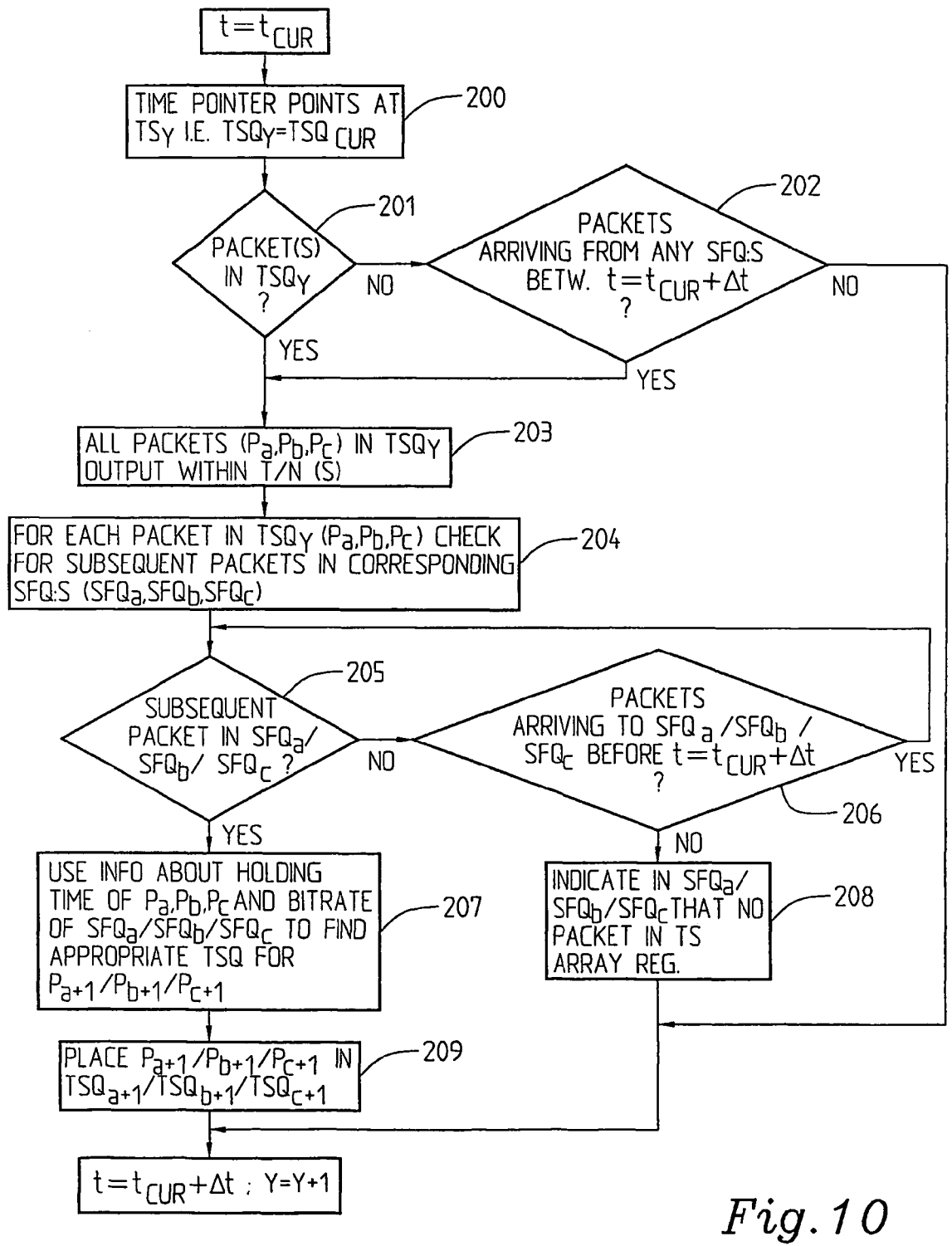
FIG. 10 is a flow diagram describing the procedure during the current time slot in one simplified, exemplary embodiment.

In the flow diagram of FIG. 10 it is supposed that the current time slot pointer just has moved one step to point at $TSQ_y$, which thus forms the current time slot $TSQ_{cur}$, 200. It is settled whether there are any packets in $TSQ_y$, 201.

If yes, it is here supposed that packets $P_a$, $P_b$, $P_c$ are queued in $TSQ_y$ (in any order). Packets $P_a$, $P_b$, $P_c$ originate from different subflow queues, here denoted $SFQ_a$, $SFQ_b$ and $SFQ_c$. It should of course be clear that there may be any number of packets from different subflow queues. Supposing that the time slot array comprises N time slots covering a time interval T, packets $P_a$, $P_b$, $P_c$ (here) will be output substantially within T/N seconds.

A situation in which it will not be possible to output all packets within T/N can be handled in different manners. In one implementation, a legging behind of the time slot pointer is accepted, in another implementation not, leading to one or more packets having to be dropped.

For each packet in $TSQ_y$, here $P_a$, $P_b$, $P_c$, it is checked for subsequent packets in the subflow queues ($SFQ_a$, $SFQ_b$, $SFQ_c$) from where they originated, 204. If there are subsequent packets in $SFQ_a$, $SFQ_b$ and $SFQ_c$, 205, information about the holding time of $P_a$ and/or $P_b$ and/or $P_c$ and the bitrate of $SFQ_a$ and/or $SFQ_b$ and/or $SFQ_c$ is used e.g. in the order as the packets are output to establish which is/are the appropriate TSQ(s) for $P_{a+1}$ and/or $P_{b+1}$ and/or $P_{c+1}$, 207. Packets $P_{a+1}$, $P_{b+1}$ and/or $P_{c+1}$ is/are then placed in the respective, appropriate time slot queue(s), 209. It should be clear that in one or more subflow queues there might not be a subsequent packet.

If in step 201 above, it was established that there was no packet at all in $TSQ_y$, it is possible that one or more packets will arrive in $TSQ_y$ from an SFQ between $t_{cur}$ and $t_{cur} + \Delta t$, i.e. as long as the current time slot pointer has not been moved to the subsequent time slot ($TSQ_{y+1}$), 202. If one or more packets actually do arrive in the meantime, the procedure will be continued with step 203 etc., as described above.

The situation will be similar if in step 205, it is established that there are no packets in e.g. $SFQ_a / SFQ_b / SFQ_c$. This means that it will be detected if any packets arrive in the respective subflow queues (here $SFQ_a / SFQ_b / SFQ_c$), from which a packet was output to $TSQ_y$ during $t = t_{cur} + \Delta t$, 206. If yes, the appropriate TSQs for such packets will be found etc, cf. step 207 etc.

Otherwise it may e.g. be indicated in $SFQ_a / SFQ_b / SFQ_c$ that there is no packet in the time slot array register, 208, since, if there was a packet from the respective subflow queue in $TSQ_y$, there cannot be any more packets form the respective subflow queues in any of the time slot queues.

Figure 11:
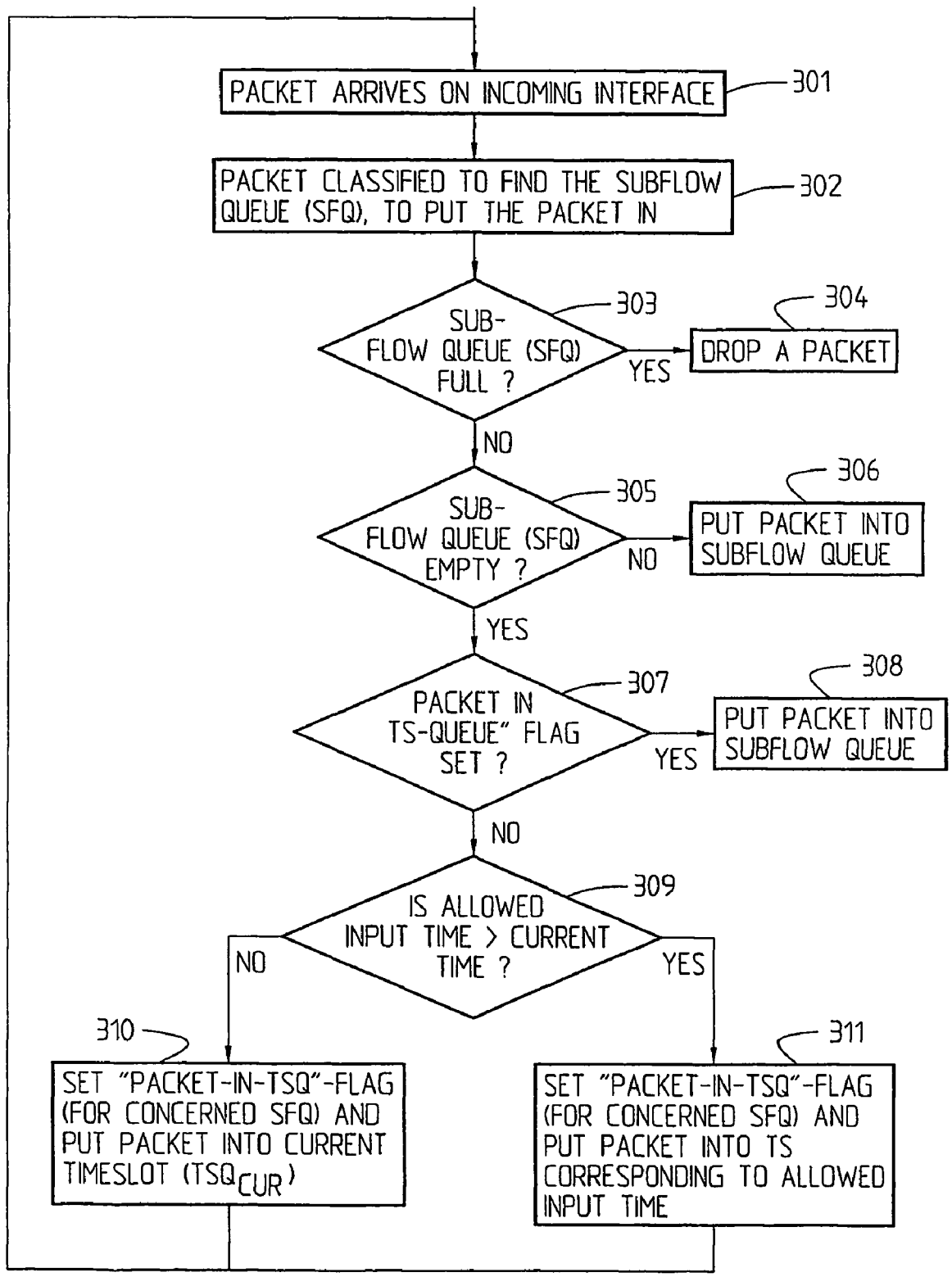
FIG. 11 is a flow diagram describing one implementation of the ingress procedure.

FIG. 11 is a somewhat more implementation specific illustration of an ingress procedure, i.e. when packets are incoming to a flow controlling arrangement. Thus it is supposed that a packet arrives on an incoming interface, 301. The packet is then classified in order to find the proper subflow queue (SFQ) to put the packet in, 302. Once the relevant SFQ is found, it is settled whether it is full, 303. If it is full, a packet will generally be dropped, 304. Any adequate discarding method may be used. If the SFQ is not full, it is examined if it is empty, 305. If not, the packet is put into the subflow queue (SFQ), 306. Otherwise, i.e. if it is empty, it is examined if the "packet-in-timeslot (TS)—queue" flag is set, 307. If yes, this means that the packet has to be put into the subflow queue, 308. Otherwise it is checked if the "allowed input time" is later than the current time, i.e. if the "effective" holding time, or "wait-until-time" is later than the current time, meaning the time that at least has to lapse since the preceding packet was output, 309. If not, a "packet-in-TSQ"-flag is set for the concerned SFQ and the packet is put into the current time slot queue ($TSQ_{cur}$), 310. Otherwise the "packet-in-TSQ" flag is set (for the concerned SFQ) and the packet is put into the TSQ corresponding to the allowed input time (wait-until-time), 311.

Figure 12:
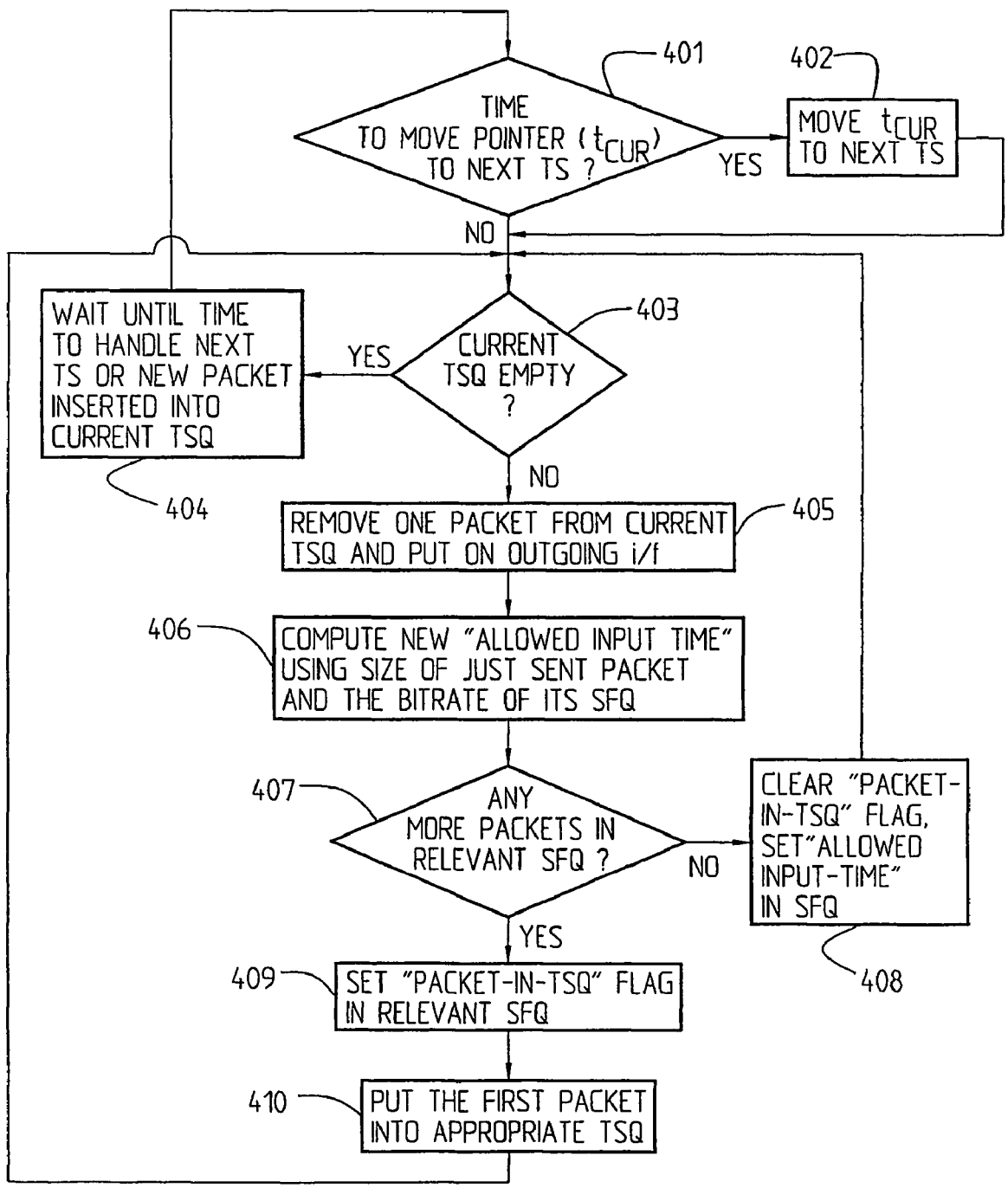
FIG. 12 is a flow diagram describing the egress procedure e.g. corresponding to the embodiment of FIG. 11.

FIG. 12 shows the egress procedure for an implementation as in FIG. 11. It is established if it is time to move the pointer ($t_{cur}$) to the next TS (time slot), 401. If yes, it is moved, 402. Then it is established whether the (now) current TSQ is empty, 403. If yes, it is waited until it is time to handle the next TS, or until a new packet is inserted into the current TSQ, 404, in which case the pointer may be moved, 402, or it may be established that TSQ is not empty, 403, as above. Thus, if the current TSQ is not empty one packet is removed from the current TSQ, 405.

A new "allowed input time" ("wait-until-time") is computed using the size of the just sent packet and the bit rate of the SFQ, 406. Then it is established if there are any more packets in the relevant SFQ, 407. If not, the "packet-in-TSQ"-flag is cleared and the "allowed input time" is set in SFQ, 408. Otherwise the "packet-in-TSQ" flag is set in the relevant SFQ, 409, and the first packet is input into the appropriate TSQ, 410. Then the procedure is repeated as from step 403 etc. taking pointer movements into account, cf. step 401, 402.

It should be clear that the calculation of the appropriate time slot queue for a packet in a subflow queue can be done in different manners. In one implementation the SFQ, or the first queueing means, may keep information about the holding time of the last output packet from the respective subflow queues. When the holding time of an output packet has lapsed, this may be indicated as zero holding time or alternatively there will be no indication at all.

In an alternative implementation, when a packet is output from a TSQ of the second queueing means, the output time is noted, the holding time is added, and information may e.g. be provided to the corresponding SFQ, or the first queueing means, about the earliest allowed output time for a subsequent packet from the same SFQ. With the use of such information, the appropriate TSQ will be found.

Also other implementations are of course possible, the main thing being that the holding times of preceding packets being used to determine when a subsequent packet may be output, in combination with the bitrate the respective subflow should have.

The invention is characterized by preserved sequence order of each subflow. Moreover, there may be more than one second queueing means for one first queueing means. The invention is of course also in other respects not limited to the specifically illustrated embodiments.

The invention claimed is:

1. An arrangement for flow control of data packets in a communications system supporting communication of packet data comprising:
   classifying means for classifying each received data packet into one of data packet subflows based on a number of parameters associated with said received data packet;
   means for assigning an individual packet holding time for said each received data packet based on the size of the data packet and bandwidth of the subflow to which the packet belongs;
   first queuing means comprising one subflow (SFQ) queue for each subflow, such that each received data packet is placed in a selected subflow queue associated with said classified subflow;
   second queuing means comprising a circular array register further including a plurality of timeslots, wherein for each timeslot a timeslot queue (TSQ) is provided and in that data packets from each subflow queue are placed in an appropriate time-slot queue in relation to a current time slot queue, the packets in which, if any, currently being, or to be, output, such that the individual packet holding time for each data packet can be observed, wherein the individual packet holding time provides a specified and predetermined time delay prior to output from the array register.

2. An arrangement according to claim 1, wherein a maximum one data packet from each subflow queue is contained in the second queuing means simultaneously.

3. An arrangement according to claim 1, wherein that when a data packet is output from the time slot queue in which it is placed, the subsequent data packet in the subflow queue from where it originated is placed in the selected time slot queue.

4. An arrangement according to claim 1, wherein that for each data packet in a time slot queue that is to be output when a time slot is the current time slot, the subsequent data packet in the respective subflow queue from where it originated is transferred to the second queuing means and placed in a time slot queue such that the requested holding times of the respective packets will be met.

5. An arrangement according to claim 1, wherein data packets stored in each of said time slot queues are outputted at a particular time interval ($t_i$) wherein said array register includes N number of time slots and T a time interval comprising N number of time slots, wherein $t_i > 0$, $N > 0$ and an integer, and $T > 0$.

6. An arrangement according to claim 5, wherein a pointer ($t_{cur}$) points at the current time slot, activating output of the packets in the corresponding time slot queue, and in that the current time slot pointer is moved a step forwards every T/N seconds.

7. An arrangement according to claim 5, wherein a pointer points at the current time slot, activating output of the packets in the corresponding time slot queue, and in that the current time slot pointer is moved a step forwards every T/N seconds or when all packets in the current time slot have been output if outputting all packets requires more time than T/N seconds.

8. An arrangement according to claim 1, wherein sorting time for sorting a data packet into a timeslot queue is constant and independent of the number of subflows.

9. An arrangement according to claim 1, wherein data packets linked into one and the same timeslot queue are placed in an arbitrary order in said time slot queue.

10. An arrangement according to claim 1, wherein said flow control arrangement is provided in a traffic node.

11. An arrangement according to claim 10, wherein said flow control arrangement is used for flow control on the downlink or on the uplink from packet data networks to end users.

12. An arrangement according to claim 1, wherein a subflow is defined by the address of the receiving end user and the packet content associated with said classifying data packets.

13. An arrangement according to claim 12, wherein a subflow is defined by the end user address, and the QoS or service class of the packet.

14. An arrangement according to claim 1, wherein said communication system includes a General Packet Radio Network and Universal Mobile Telecommunications System (GPRS/UMTS) system and in that a subflow is defined by a GPRS Tunneling Protocol (GTP-tunnel) or a PDP-Context.

15. An arrangement according to claim 13, wherein for each service class, or QoS class an end user subscribes to, one subflow is defined.

16. An arrangement according to claim 14, wherein said data flow arrangement is provided in a packet data node, upstreams in the flow direction of the subflows with respect to a network part or a link having the smallest bandwidth.

17. A traffic node in a communications system supporting communication of packet data, and controlling flow of data packets within said communication system comprising:
   classifying means for, based on a number of parameters, defining a number of packet subflows from the total flow of data packets handled by said traffic nodes;
   first and second queuing means for controlling the data packet traffic flow on a per subflow basis, using individual data packet holding times given by the size of each respective packet and by the bandwidth of the subflow to which the respective data packet belongs, wherein the individual packet data holding time provides a specified and predetermined time delay prior to output from the traffic node; and
   wherein the first queuing means comprises one subflow queue for each subflow, such that data packets received are placed in a selected subflow queue, and the second queuing means comprises a circular array register with a plurality of time slots, wherein for each timeslot a timeslot queue is provided, and data packets from the subflow queues are placed in the selected time slot queues of the respective second queuing means in relation to a current time slot queue to meet the holding time requirements of the individual data packets.

18. A traffic node according to claim 17, wherein that the holding time requirements are given by the bandwidth for the respective subflow to which a packet belong and by packet size.

19. A traffic node according to claim 18, wherein a maximum one data packet from each subflow queue is contained in the second queuing means simultaneously, such that when a data packet is output from the time slot queue in which it is placed, a subsequent data packet in the same subflow queue is placed in a selected time slot queue to assure that holding time of the subsequent data packet is assured.

20. A traffic node according to claim 19, wherein the second queuing means comprises an array of N time slots each time slot having a given time interval T, wherein N>0 and an integer and T>0; a pointer for pointing at the current time slot to activate output of the data packets in a corresponding time slot queue, wherein the current time slot pointer is moved a step forward every T/N seconds unless packets still remain to be output after T/N has lapsed.

21. A traffic node according to claim 20 wherein the appropriate time slot queue TSQ for a subsequent data packet $P_i$ is given by $TS_{current}+N$(packet size of the preceding data packet $P_{i-1}*8$/bitrate of $P_i$ subflow), wherein $TS_{current}$ is the current time slot and N is the number of time slots in TS, wherein TSQ>0, $P_i$>0, $TS_{current}$>0, and $P_{i-1}$>0.

22. A traffic node according to claim 17 is a Gateway GPRS Serving Node (GGSN) or a Serving GPRS Support Node (SGSN) in General Packet Radio Service (GPRS)/Universal Mobile Telecommunications System (UMTS) and in a subflow is defined as a GTP-tunnel.

23. A traffic node according to claim 22, wherein that the bandwidth for a subflow is determined by the link having the most severe bandwidth requirements on the path between external packet data network and an end user station (UE).

24. A method of packet data traffic control in a communication system supporting communication of packet data comprising the steps of
defining, using a number of parameters, a number of subflows among the flow of packets incoming to a flow controlling arrangement;
placing data packets incoming to the flow controlling arrangement in subflow queues, one subflow queue per subflow;
determining an individual holding time for each data packet of a subflow depending on the size of the data packet and on the bandwidth of the subflow to which the data packet belongs, before or after the step of:
transferring data packets from each subflow queue to second queuing means comprising a circular timeslot array register with one timeslot queue per time slot;
for each subflow, consecutively placing a first data packet of one of the subflow queues in a corresponding timeslot queue determined by the holding time of a preceding data packet from the one of the subflow queues, such that always a maximum one data packet from the subflow is queued in the second queuing means at the same time, wherein the holding time provides a specified and predetermined time delay prior to output from the flow control arrangement;
wherein for each timeslot a timeslot queue (TSQ) is provided and in that data packets from each subflow queue are placed in an appropriate time-slot queue in relation to a current time slot queue, the packets in which, if any, currently being, or to be, output, such that the individual packet holding time for each data packet can be observed.

25. The method of claim 24, wherein that one or more second queuing means are provided, each comprising an array of time slots, each defining a time interval, such that a number of time slot queues are provided in the second queuing means, which number is different in different second queuing means.

26. The method of claim 25, wherein that the output of data packets stored in the time slot queues is carried out as:
using a time slot pointer to point at a time slot T to activate output of the packets stored in the queue corresponding to said time slot, which thus forms a current time slot, N being the total number of time slots; and
moving the time slot pointer one step forwards every T/N second or one step forward every T/N seconds unless one or more packets remains to be output, in which case the time slot pointer is moved when all packets have been output.

27. The method of claim 24 wherein that it further comprises the steps of:
for each data packet output from a timeslot queue;
placing the subsequent data packet, if any from the same subflow queue as the output packet originated, in an appropriate time slot queue, by calculating the appropriate time slot queue TSQ for a subsequent data packet $P_i$ as the sum of the current time slot and $N*$(the packet size of the preceding packet $P_{i-1}$)*8/the bit rate of the subflow to which the data packets belong, wherein TSQ>0, $P_i$>0, and $P_{i-1}$>0.

28. The method of claim 24, wherein the step of defining subflows comprises:
using the end user address and the service class (QoS class) as parameters, such that one subflow is defined for each receiving end user per service class (QoS class).

29. The method of claim 28, wherein the system is Universal Mobile Telecommunications System (UMTS) and that for each GPRS Tunneling Protocol (GTP-tunnel) a subflow is defined.

* * * * *

UNITED STATES PATENT AND TRADEMARK OFFICE
CERTIFICATE OF CORRECTION

PATENT NO. : 7,616,570 B2  Page 1 of 1
APPLICATION NO. : 10/470851
DATED : November 10, 2009
INVENTOR(S) : Ronneke et al.

It is certified that error appears in the above-identified patent and that said Letters Patent is hereby corrected as shown below:

In Column 4, Line 54, delete "ordo(I)algorithm" and insert -- ordo(1)algorithm --, therefor.

In Column 11, Line 39, delete "TIN" and insert -- T/N --, therefor.

In Column 13, Line 8, delete "$Modulo_n, [timeslot_{tcur}$" and insert -- $Modulo_n [timeslot_{tcur}$ --, therefor.

In Column 20, Line 9, in Claim 7, delete "TIN" and insert -- T/N --, therefor.

In Column 20, Line 11, in Claim 7, delete "TIN" and insert -- T/N --, therefor.

Signed and Sealed this

Sixteenth Day of March, 2010

David J. Kappos
*Director of the United States Patent and Trademark Office*